US007925388B2

(12) United States Patent
Ying

(10) Patent No.: US 7,925,388 B2
(45) Date of Patent: *Apr. 12, 2011

(54) REMOTELY CONTROLLABLE WIRELESS ENERGY CONTROL UNIT

(75) Inventor: Jeffrey Ying, Azusa, CA (US)

(73) Assignee: Yingco Electronics, Inc., Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,754

(22) Filed: Feb. 23, 2010

(65) Prior Publication Data

US 2010/0152914 A1    Jun. 17, 2010

Related U.S. Application Data

(60) Division of application No. 11/221,206, filed on Sep. 6, 2005, now Pat. No. 7,693,610, which is a continuation of application No. 11/012,879, filed on Dec. 14, 2004, now Pat. No. 7,324,876, which is a continuation-in-part of application No. 10/007,501, filed on Nov. 30, 2001, now Pat. No. 6,832,135, which is a continuation-in-part of application No. 09/903,403, filed on Jul. 10, 2001, now Pat. No. 6,636,141, said application No. 11/012,879 is a continuation-in-part of application No. 10/900,971, filed on Jul. 28, 2004, now Pat. No. 7,265,652, which is a continuation-in-part of application No. 10/307,222, filed on Nov. 27, 2002, now Pat. No. 6,825,750, which is a continuation-in-part of application No. 09/903,403, filed on Jul. 10, 2001, now Pat. No. 6,636,141.

(51) Int. Cl.
*G05D 11/00*    (2006.01)

(52) U.S. Cl. ............................ 700/295; 700/286; 337/16

(58) Field of Classification Search .................. 700/286, 700/295; 337/16
See application file for complete search history.

(56) References Cited

U.S. PATENT DOCUMENTS 1,891,015 A    12/1932   Rich ............................ 337/37
(Continued)

FOREIGN PATENT DOCUMENTS

DE    3544989 A1    7/1987
(Continued)

OTHER PUBLICATIONS

Wells, W., "Blackout Blues, Power Outages a Real Threat to Info Economy," The Zone News, Sep. 2000.

*Primary Examiner* — Michael D Masinick
(74) *Attorney, Agent, or Firm* — Irell & Manella LLP

(57) ABSTRACT

A power management system and associated method includes provision of local wireless energy control units at remote sites for controlling power delivery to customer loads, and a central station with a wireless transmitter for broadcasting commands to the wireless energy control units. The wireless energy control units each comprise a bank of switches for controlling power delivery to electrical loads at each local site. The controllable switches preferably have a deformable bimetal member controlled by a heated coil for engaging and disengaging electrical contacts. Each wireless energy control unit is capable of being pre-configured so as to specify the order or priority in which electrical loads are disengaged, in response to commands to reduce power consumption received from the central station. The central station issues power reduction commands according to different priority levels or alert stages, causing the local wireless energy units to disengage local loads accordingly.

16 Claims, 19 Drawing Sheets

U.S. PATENT DOCUMENTS

| | | | |
|---|---|---|---|
| 2,012,215 A | 8/1935 | Barthe | 337/4 |
| 2,248,531 A | 7/1941 | Harris | 337/95 |
| 2,381,784 A | 8/1945 | Strobel | 236/68 |
| 2,487,268 A | 11/1949 | Oleson | 337/370 |
| 2,563,341 A | 8/1951 | Kettering | 200/61.05 |
| 2,574,869 A | 11/1951 | Francis | 337/88 |
| 2,605,339 A | 7/1952 | Connolly | 200/83 R |
| 2,769,060 A | 10/1956 | Franklin | 337/370 |
| 3,108,166 A | 10/1963 | Baker et al. | 337/102 |
| 3,284,597 A | 11/1966 | Hollis | 337/103 |
| 3,342,961 A | 9/1967 | Deaton | 337/36 |
| 3,371,175 A | 2/1968 | Benedik | 337/102 |
| 3,416,117 A | 12/1968 | Grosse-Brauckmann | 337/358 |
| 3,501,718 A | 3/1970 | Chambers | 335/66 |
| 3,601,736 A | 8/1971 | Sepe | 337/101 |
| 3,629,762 A | 12/1971 | Walling | 337/62 |
| 3,629,763 A | 12/1971 | Walling | 337/66 |
| 3,660,792 A | 5/1972 | Strain et al. | 337/102 |
| 3,706,916 A | 12/1972 | Halbeck et al. | 317/33 SC |
| 3,767,936 A | 10/1973 | Sweger | 307/117 |
| 3,808,572 A | 4/1974 | Gaskill | 337/106 |
| 3,863,186 A | 1/1975 | Mallonen | 337/99 |
| 3,883,781 A | 5/1975 | Cotton | 317/14 R |
| 3,914,722 A | 10/1975 | Mallonen | 335/44 |
| 3,952,534 A | 4/1976 | Jacobs | 62/136 |
| 3,968,468 A | 7/1976 | Andersen | 29/622 |
| 3,983,454 A | 9/1976 | Cotton et al. | 317/14 J |
| 4,023,043 A | 5/1977 | Stevenson | 307/38 |
| 4,031,406 A | 6/1977 | Leyde et al. | 307/41 |
| 4,033,029 A | 7/1977 | Wolfe | 29/622 |
| 4,110,719 A | 8/1978 | Kirkup | 337/46 |
| 4,117,346 A | 9/1978 | Burgess | 307/117 |
| 4,124,835 A | 11/1978 | Cahill, Jr. | 337/1 |
| 4,135,101 A | 1/1979 | Young et al. | 307/39 |
| 4,146,923 A | 3/1979 | Borkan | 364/483 |
| 4,153,936 A | 5/1979 | Schmitz et al. | 364/493 |
| 4,160,917 A | 7/1979 | Wald | 307/64 |
| 4,165,502 A | 8/1979 | Andersen | 335/39 |
| 4,184,633 A | 1/1980 | Bata et al. | 236/68 R |
| 4,185,272 A | 1/1980 | Feiker | 340/168 |
| 4,216,384 A | 8/1980 | Hurley | 307/39 |
| 4,247,786 A | 1/1981 | Hedges | 307/35 |
| 4,264,960 A | 4/1981 | Gurr | 364/492 |
| 4,315,251 A | 2/1982 | Robinson et al. | 340/310 |
| 4,329,669 A | 5/1982 | Krasser et al. | 335/21 |
| 4,345,233 A | 8/1982 | Matthies | 307/141 |
| 4,360,881 A | 11/1982 | Martinson | 364/493 |
| 4,476,452 A | 10/1984 | D'Entremont | 337/102 |
| 4,513,382 A | 4/1985 | Faulkner, Jr. | 364/492 |
| 4,562,550 A | 12/1985 | Beatty et al. | 700/295 |
| 4,563,667 A | 1/1986 | Hofass | 337/349 |
| 4,620,283 A | 10/1986 | Butt et al. | 700/295 |
| 4,625,190 A | 11/1986 | Wafer et al. | 335/20 |
| 4,771,185 A | 9/1988 | Feron et al. | 307/39 |
| 4,780,872 A | 10/1988 | Masuda et al. | 370/92 |
| 4,788,415 A | 11/1988 | Whipple, Jr. | 219/508 |
| 4,788,518 A | 11/1988 | Sako et al. | 337/49 |
| 4,862,133 A | 8/1989 | Tabei | 337/102 |
| 4,935,733 A | 6/1990 | Munekata | 340/825.57 |
| 5,008,662 A | 4/1991 | Tokizane et al. | 340/825.06 |
| 5,021,761 A | 6/1991 | Stack et al. | 337/68 |
| 5,021,762 A | 6/1991 | Hetrick | 337/103 |
| 5,117,421 A | 5/1992 | Tokizane et al. | 370/85.1 |
| 5,189,412 A | 2/1993 | Mehta et al. | 340/825.22 |
| 5,191,310 A | 3/1993 | Obermann et al. | 337/105 |
| 5,295,062 A * | 3/1994 | Fukushima | 700/83 |
| 5,307,058 A | 4/1994 | Tokizane et al. | 340/825.07 |
| 5,381,121 A | 1/1995 | Peter et al. | 335/20 |
| 5,444,439 A | 8/1995 | Kuroda et al. | 340/825.07 |
| 5,455,464 A | 10/1995 | Gosling | 307/31 |
| 5,506,573 A | 4/1996 | Ewing et al. | 340/644 |
| 5,565,855 A | 10/1996 | Knibbe | 340/3.51 |
| 5,572,438 A | 11/1996 | Ehlers et al. | 700/295 |
| 5,576,700 A | 11/1996 | Davis et al. | 340/3.31 |
| 5,675,503 A | 10/1997 | Moe et al. | 364/492 |
| 5,694,106 A | 12/1997 | Wang | 337/79 |
| 5,847,636 A | 12/1998 | Sehlhorst | 337/303 |
| 5,854,585 A | 12/1998 | Kingma | 337/367 |
| 5,870,014 A | 2/1999 | Nield et al. | 337/333 |
| 5,892,428 A | 4/1999 | Hsu | 337/318 |
| 5,892,644 A | 4/1999 | Evans et al. | 361/19 |
| 5,936,505 A | 8/1999 | Yu | 7/66 |
| 5,982,596 A | 11/1999 | Spencer et al. | 361/64 |
| 5,986,358 A | 11/1999 | Hsieh | 307/117 |
| 6,008,971 A | 12/1999 | Duba et al. | 361/64 |
| 6,075,436 A | 6/2000 | Hsu | 337/318 |
| 6,107,938 A | 8/2000 | Du et al. | 340/825.72 |
| 6,195,243 B1 | 2/2001 | Spencer et al. | 361/64 |
| 6,292,233 B1 | 9/2001 | Erba et al. | 348/730 |
| 6,411,190 B1 | 6/2002 | Yamaguchi et al. | 180/279 |
| 6,462,665 B1 | 10/2002 | Tarlton et al. | 340/601 |
| 6,510,369 B1 | 1/2003 | Lacy | 700/295 |
| 6,512,441 B1 | 1/2003 | Yu | 337/37 |
| 6,519,509 B1 | 2/2003 | Nierlich et al. | 700/286 |
| 6,538,568 B2 | 3/2003 | Conley | 340/540 |
| 6,563,414 B2 | 5/2003 | Yu | 337/66 |
| 6,590,489 B1 | 7/2003 | Ullermann et al. | 337/56 |
| 6,624,532 B1 | 9/2003 | Davidow et al. | 307/39 |
| 6,633,823 B2 | 10/2003 | Bartone et al. | 702/57 |
| 6,671,586 B2 | 12/2003 | Davis et al. | 700/295 |
| 2001/0015011 A1 | 8/2001 | Glabau et al. | 29/868 |
| 2006/0052906 A1* | 3/2006 | Kates | 700/295 |

FOREIGN PATENT DOCUMENTS

| | | |
|---|---|---|
| EP | 0 213 270 | 3/1987 |
| JP | 364001 | 2/1949 |
| JP | H3-38925 | 10/1984 |
| JP | 62-193481 | 8/1987 |
| JP | S64-13646 | 1/1989 |
| JP | 1-140532 | 6/1989 |
| JP | H3-118534 | 12/1991 |
| JP | 8-161995 | 6/1996 |
| JP | 1-1162312 | 6/1999 |
| JP | H11-162312 | 6/1999 |

* cited by examiner

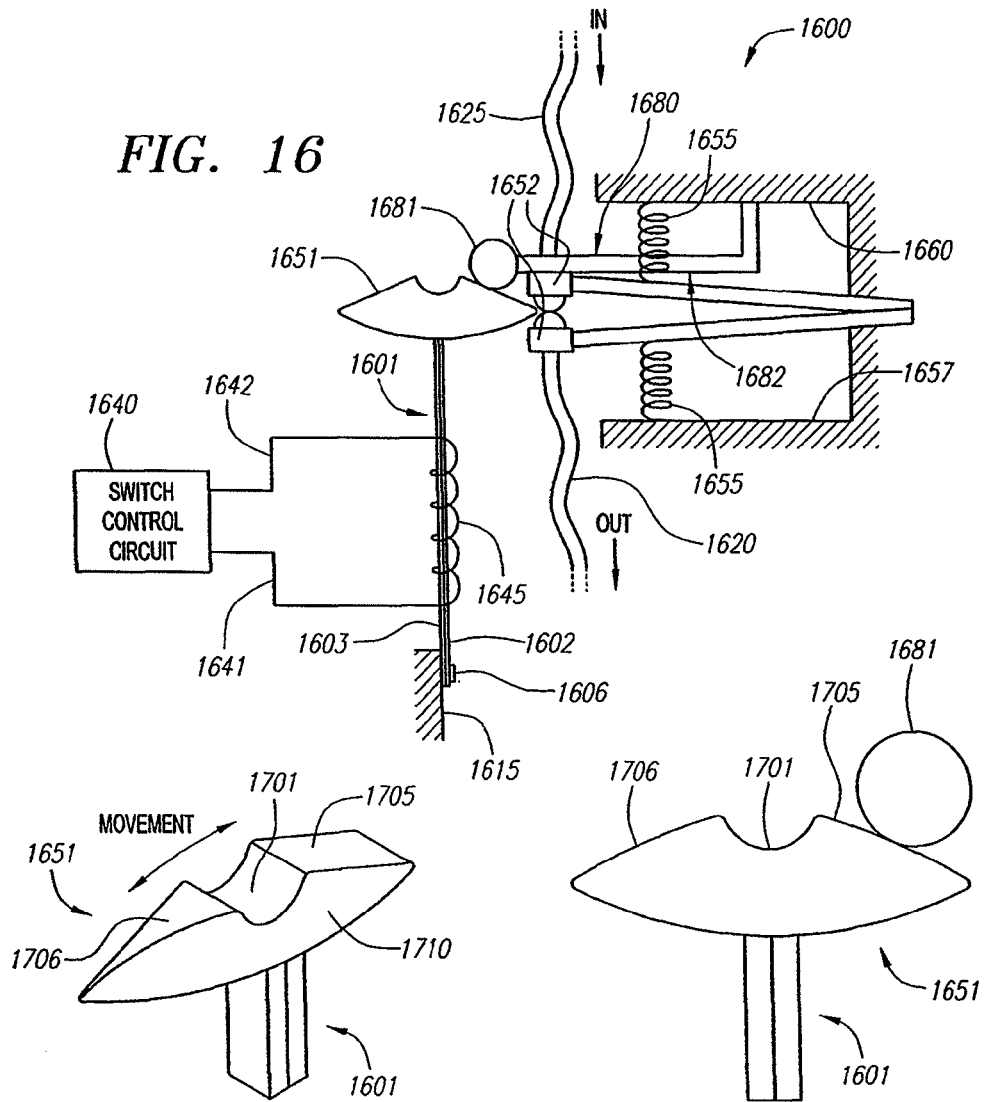
FIG. 16
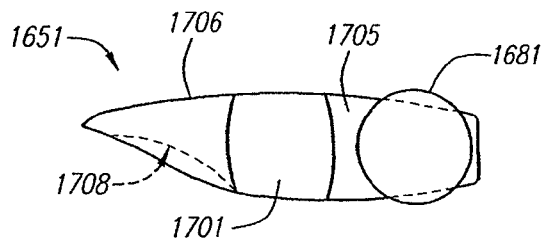
FIG. 17-1    FIG. 17-2
FIG. 17-3

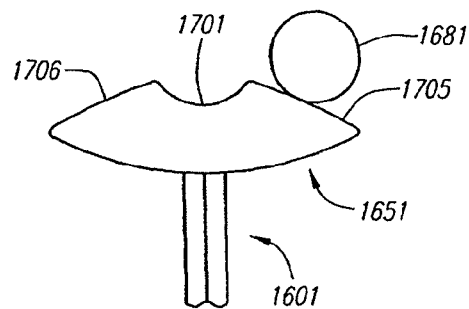
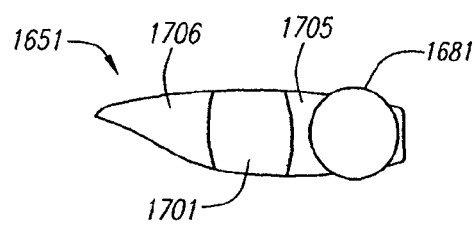
FIG. 18-1    FIG. 18-2
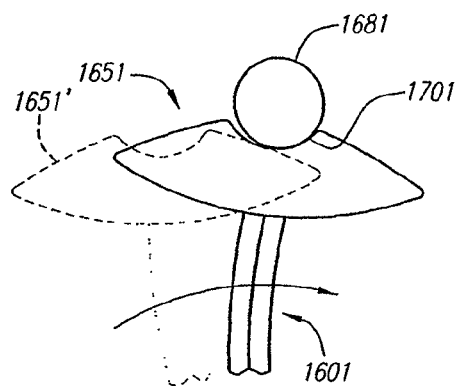
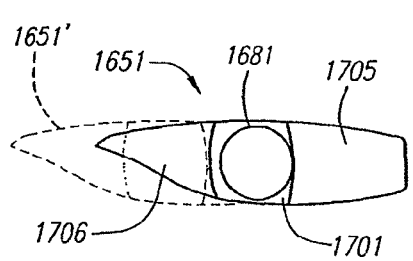
FIG. 18-3    FIG. 18-4
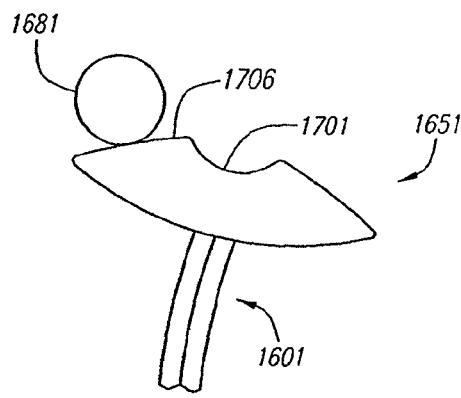
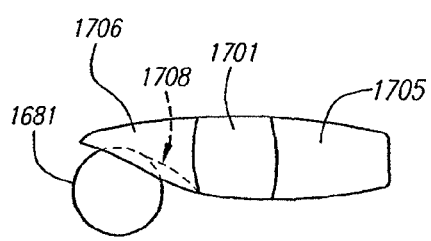
FIG. 18-5    FIG. 18-6

REMOTELY CONTROLLABLE WIRELESS ENERGY CONTROL UNIT

RELATED APPLICATION INFORMATION

This application is a divisional of U.S. patent application Ser. No. 11/221,206, filed Sep. 6, 2005, which is a continuation of U.S. patent application Ser. No. 11/012,879 filed on Dec. 14, 2004, now U.S. Pat. No. 7,324,876, which is a continuation-in-part of two other applications: (1) U.S. patent application Ser. No. 10/007,501 filed on Nov. 30, 2001, now U.S. Pat. No. 6,832,135, which is in turn a continuation-in-part of U.S. patent application Ser. No. 09/903,403 filed on Jul. 10, 2001, now U.S. Pat. No. 6,636,141, and (2) U.S. patent application Ser. No. 10/900,971 filed on Jul. 28, 2004, now U.S. Pat. No. 7,265,652, which is a continuation-in-part of U.S. patent application Ser. No. 10/307,222, now U.S. Pat. No. 6,825,750, which is also a continuation-in-part of U.S. patent application Ser. No. 09/903,403 identified above; all of which are hereby incorporated by reference as if set forth fully herein.

BACKGROUND OF THE INVENTION

1. Field of the Invention

The field of the invention generally pertains to systems and methods for controlling energy distribution at local sites.

2. Background

Electrical utilities face particular challenges in meeting continuously changing customer load demands. At least two related reasons exist for these challenges. First, power demands can fluctuate substantially from day to day or hour to hour, making it difficult for utilities to ensure that they have enough capacity to meet demand. These fluctuations in energy demand may arise from ordinary cyclic energy usage patterns (for example peaking in the afternoon), or else can result from an unexpected change in the balance between energy supply and demand, such as where, for example, a power generator linked to the power grid unexpectedly goes down, large energy users go on or off line, or a fault occurs somewhere in the distribution system.

A second factor contributing to the challenges faced by power utilities is the fact that power consumption in local areas tends to grow over time, gradually placing increasing burdens on electrical utilities to meet the growing demand. Because the construction of new power plants is very costly and must comply with a variety of governmental regulations, it is possible for a local or even large geographic region to find itself without the power capacity to supply its current or anticipated future demand.

A major challenge for utility companies is handling peak energy demands. This is because the energy supplied by power utilities must be sufficient to meet the energy demand moment by moment, and peak demands place the greatest strain on the power distribution system. When energy demand outstrips available supply, disruptive events such as power blackouts, brownouts or interruptions can occur. Not only can such events cause substantial inconvenience to large numbers of people and businesses, but they can also be dangerous or life-threatening—where, for example, the power supply for hospitals or critical home care medical equipment is compromised.

Historically, when power utilities serving a locality have been faced with a severe energy situation caused by high demand, their options have been extremely limited. Power utilities can, for example, request that consumers conserve energy, but not all consumers follow such requests and, in any event, conservation has not tended to provide a complete solution for energy supply problems. Power utilities can attempt to satisfy peak demands by purchasing available energy from a third party source connected to the power grid, but such purchases, particularly at peak demand times, can be extremely costly as energy suppliers often demand a premium when demand is high. Another option is for power utilities to build additional power plants, but building power plants takes substantial time and investment, and may require approvals from state and/or federal government authorities as well as consumer associations.

To help reduce peak power demand and thus ward off costs associated with new power plants or premium energy purchases, various attempts have been made to develop load management systems which control peak demand on the power generating equipment by temporarily turning off certain customer loads when deemed necessary to avoid a blackout or similar power interruption. Generally, the types of customer loads that are regulated in this manner involve non-critical electrical equipment such as air conditions, electric heaters, and the like.

One type of load management system, for example, uses ripple tone injection to send coded pulses over the utility's power lines. The coded pulses may be applied to the utility power lines by way of an electromechanical ripple control transmitter, which may consist of a motor/alternator operating through thyristor static switches, or by way of a step-up transformer selectively connected to the utility power lines through a passband circuit tuned to the frequency of the coded pulse signal. At the customer sites, receivers interpret the coded pulses and perform desired command functions—e.g., turning off the customer load(s).

An example of a particular system for load management is described in U.S. Pat. No. 4,264,960. As set forth in that patent, a plurality of substation injection units, under control of a master control station, transmit pulse coded signals on the utility power lines. Remote receiver units positioned at customer loads control the on and off states of the loads in response to the signals received over the utility power lines from the substation injection units, by activating latchable single-pole contacts. Different types of loads are organized into load control groups (e.g., electrical hot water heaters, air conditioner compressors, street lights, etc.). The master control station independently controls the various different types of loads through different pulse control signals. Each remote receiver unit is pre-coded so that it responds to one and only one pulse code signal. In order to control different types of loads (e.g., hot water heater and air conditioning compressor) at the same location, separately encoded remote receiver units at the location are required. The master control station turns load groups on and off in order to implement a load management strategy, as determined by a system operator.

A variety of drawbacks or limitations exist with conventional techniques for load management in large-scale power distribution systems. A major drawback is that shut-off commands from the power utility to the remote customer sites are generally propagated over the same lines that carry high-voltage electricity. Because transformers are used to relay electrical signals across power lines, it can be difficult to pass data (e.g., shut-off commands or other control signals) over power lines. Moreover, noise or interference can prevent proper reception of shut-off commands or other control signals. Any inductance at the customer load can generate large harmonics, which can easily match the control signal frequency, thus blocking out control signals or possibly causing "false alarms." A simple household device such as an electric oven can disrupt the reception of control signals over power lines. Over a large area, since all loads inject noise into the power distribution system, the cumulative interference or noise effect can be substantial. Thus, using power lines to distribute control signals can be quite problematic, because of the many sources of noise and interference. Sophisticated digital signal processing techniques might be used to filter out the noise or interference and reconstruct control signals, but such techniques are complicated and would generally require that a receiver be quite costly.

Another drawback with conventional techniques for load management is the lack of control either at the utility or consumer level. In situations where the utility is forced to shut off power to one or more regions (e.g., by causing a rolling blackout) in order to prevent peak demand from causing a catastrophic blackout or damaging power generation or distribution equipment, power customers typically have little or no control over which loads get shed. Rather, a complete shut-down of the customer's power usually occurs for those customers within a region subject to a rolling blackout. Even in those situations where the utility has pre-configured the customer's wiring so that certain isolated loads (usually an air conditioner or electric water heater) can be dynamically shed at peak power times, neither the utility nor the customer can easily alter which loads get shed unless the customer's wiring is re-configured. Where the customer loads are collectively grouped into different load control groups, the utility may be able to shed certain types of loads (e.g., all air conditioners) en masse, but the choice is generally made by the utility based upon its overall power demands and management strategy, with little or no control being available to the customer (other than perhaps initially giving permission to the utility to shut down a specific load, such as an air conditioning unit, before the utility pre-configures the wiring to control the specific load as part of a larger group of similar loads).

Another problem that remains insufficiently addressed by conventional load management techniques is the fact that power interruptions, brownouts or blackouts generally occur with little or no warning to power customer. In some cases, where unusually large demand can be forecasted, electrical utilities have been able to provide warnings to power customers that a blackout or power interruption is likely within a certain upcoming period of time—e.g., within the next several hour period, or next 24 or 48 hour period. However, power interruption or blackout warnings are typically so broad and vague in nature as to be of limited or no value to power customers, who are left with uncertainty as to whether or not their power will go out and if so, exactly when. Moreover, since power interruption or blackout warnings are normally broadcast by radio or television, customers who are not tuned in by radio or television to the broadcast stations can easily miss the warnings and not realize that a power interruption or blackout is imminent.

Certain power management techniques have been proposed for controlling power consumption at a specific local site (e.g., a factory), but such systems are usually isolated and operate independently of the power utility. An example of one power management system is described, for example, in U.S. Pat. No. 4,216,384. According to a representative technique described therein, the various main power lines of the installation or site are monitored for energy usage, and a control circuit selectively disconnects loads when the total energy being drawn at the installation or site exceeds a specified maximum. While ostensibly having the effect of reducing overall power consumption at the installation or site, a drawback of these types of power management systems is that they can be relatively complex and costly. For example, the power management system described in U.S. Pat. No. 4,216,384 utilizes a set of transformers to independently monitor various main power lines, a bank of LED-triggered Triacs to selectively engage various customer loads, programmable control circuitry, automatic priority realignment circuitry, and so on. Because of their relative cost and complexity, these types of local power management systems are not very suitable for widespread use, particularly for ordinary residential use or other cost-sensitive applications. Moreover, their operation is very localized in effect, and cannot be controlled from a central location such as the power utility itself.

In addition to the foregoing limitations and drawbacks, conventional power and load management strategies are limited by the available circuits and switches which are used in some applications to control actual power delivery at local sites. One common type of power switch, for example, for connecting and disconnecting power sources to loads is a circuit breaker, which functions to prevent an excessive amount of current from being drawn from the power source or into the load by breaking the electrical circuit path between the source and load when the current limit is reached. A typical circuit breaker has a bimetal arm through which travels a power signal from the source to the load. One end of the bimetal arm is connected to the power signal line, while the other end of the bimetal arm is connected to an electrical conductor from which the power can be distributed to the load. When too much current travels through the bimetal arm, the heat from the current causes the bimetal arm to deform or bend in a predictable manner, which causes the bimetal arm to break contact with the electrical conductor, resulting in a break between the power signal and the load. In this manner, the source and load are both protected from currents which exceed a certain limit.

While circuit breakers are useful for protecting against high current levels, they are generally passive circuit elements whose response depends entirely upon the amount of power being drawn by the load. They typically do not provide active control of a power signal line. However, some resettable circuit breakers have been proposed, which utilize, for example, a spring-operated mechanism allowing a remote operator to open and close the contacts of the circuit breaker. An example of such a circuit breaker is disclosed in U.S. Pat. No. 3,883,781 issued to J. Cotton.

Other types of remotely controlled or operated circuit breakers are described, for example, in U.S. Pat. No. 5,381,121 to Peter et al., and U.S. Pat. No. 4,625,190 to Wafer et al. These circuit breakers involve rather elaborate mechanisms that, due to their complexity, would be expensive to manufacture and potentially subject to mechanical wear or failure.

Besides circuit breakers, other types of circuits have been utilized in controlling power signals. However, these other types of circuits have drawbacks as well. For example, solid state switches (e.g., transistors or silicon-controlled rectifiers (SCRs)) can be used as switches between a power source and load, for controlling distribution of the power signal to the load. However, transistors and SCRs generally have limited power ratings and, at high current levels, can become damaged or shorted. Moreover, transistors or SCRs with high power ratings can be relatively expensive.

It would therefore be advantageous to provide a load management system that overcomes one or more of the foregoing problems, limitations or disadvantages. It would further be advantageous to provide a load management system that gives more flexibility to power utilities and/or consumers, that is not subject to the noise and interference effects caused by transmitting data over power lines, and does not require a relatively expensive receiver. It would also be advantageous to provide a load management system that uses a controllable electronic switch capable of selectively connecting or disconnecting a power source to a load and, in particular, a switch that is reliable, durable, and low-cost, and that can handle relatively high power demands, such as may be required for residential or commercial applications.

SUMMARY OF THE INVENTION

The invention in one aspect is generally directed to systems and methods for managing or controlling power distribution at local sites.

In one aspect, a local energy control unit includes a set of controllable switches for controlling power delivery from a power supply line to individual electrical loads. The energy control unit preferably causes the controllable switches to engage or disengage their respective electrical loads, in a configurable order, when an external command is received. The energy control unit can be user-configured (e.g., programmed) to prioritize the order in which loads are disengaged. In a preferred embodiment, the controllable switches are electrically connected in series with (e.g., downstream from) a set of circuit breakers, and the controllable switches are preferably capable of selectively disengaging and re-engaging electrical loads as may be present, for example, at commercial or residential electrical outlets, while drawing little or no power when conducting.

In another aspect, an energy management system and associated method therefore involve the use of remotely located energy control units at various customer sites for controlling energy distribution to customer loads. The energy control units each preferably comprise a set of controllable switches for controlling power delivery to various local electrical loads. A user may pre-configure the energy control unit to specify the order or priority in which electrical loads are disengaged, in response to commands to reduce energy consumption. A wireless command system allows the energy control units to receive commands from a distant location, such as a central transmitter or a collection of geographically dispersed transmitters. A central station can issue energy reduction commands or other similar messages according to different priority levels. The energy control units respond to the energy reduction commands by disengaging one or more electrical loads in accordance with the priority level of the energy reduction command. By the collective operation of the local energy control units at their various remote locations, a substantial overall power reduction can be realized, particularly, for example, at times of peak power demand.

In various embodiments, the local energy control units may be outfitted with added features that enhance their utility. For example, in certain embodiments, an energy control unit may be configured with a programmable timer function, allowing the priority by which the controllable switches are activated to automatically adjust based upon the particular day of the week, time of day, and so on. The energy control unit may also be configured with a memory to record the states of the various controllable switches, or other system parameters, over time. The memory may be triggered to record only after an event which causes one or more electrical loads to be disengaged.

In a preferred embodiment, a controllable electronic switch, as may be used in various embodiments of an energy control unit having a set of controllable electronic switches for selectively disabling local electrical loads, comprises a deformable member (e.g., a bimetal member or arm) anchored at one end and in controllable contact with an electrical conductor at the other end. An incoming power wire is connected to the bimetal member near the contact point with the electrical conductor. A heating element (such as a coil) is coupled to the bimetal member, and is controlled by a switch control signal. When the switch control signal is not asserted, the heating element is inactive, and power is delivered through the incoming power wire across the end of the bimetal member to the electrical conductor, from which it can be further distributed to the load. When the switch control signal is asserted, the heating element heats up causing the bimetal to bend until the contact with the electrical conductor is broken. The electrical path from the incoming power wire to the electrical conductor (and hence, to the load) is then broken. So long as the switch control signal is asserted, the heating element continues to keep the bimetal bent and the electrical path broken.

Further embodiments, variations and enhancements are also disclosed herein.

BRIEF DESCRIPTION OF THE DRAWINGS

FIG. 5-1 is a diagram illustrating an example of the flow of electricity when the circuit breaker of FIG. 4 is closed (normal operation), and FIG. 5-2 is a diagram illustrating an example of how the bimetal of the circuit breaker breaks the circuit connection when an over-current situation occurs.

FIG. 7-1 is a diagram illustrating an example of the flow of electricity when the electronic switch of FIG. 6 is closed, and FIG. 7-2 is a diagram illustrating how the bimetal of the electronic switch of FIG. 6 breaks the circuit connection in response to assertion of a control signal.

FIG. 16 is a diagram of another embodiment of a controllable electronic switch using a wedge to break electrical contacts in a circuit path, having a mechanical cam with multiple latching positions.

FIGS. 17-1, 17-2 and 17-3 are diagrams illustrating the controllable electronic switch of FIG. 16 with the latch in an engaged position with respect to the cam.

FIGS. 18-1 through 18-8 are diagrams illustrating different latching positions of the cam of the controllable electronic switch of FIG. 16.

FIGS. 27-1 and 27-2 are diagrams illustrating operation of the controllable switch depicted in FIG. 26.

FIGS. 29-1 and 29-2 are diagrams illustrating operation of the controllable switch depicted in FIG. 28.

FIGS. 31-1 and 31-2 are diagrams illustrating operation of the controllable switch depicted in FIG. 30.

DETAILED DESCRIPTION OF PREFERRED EMBODIMENTS

Figure 1:
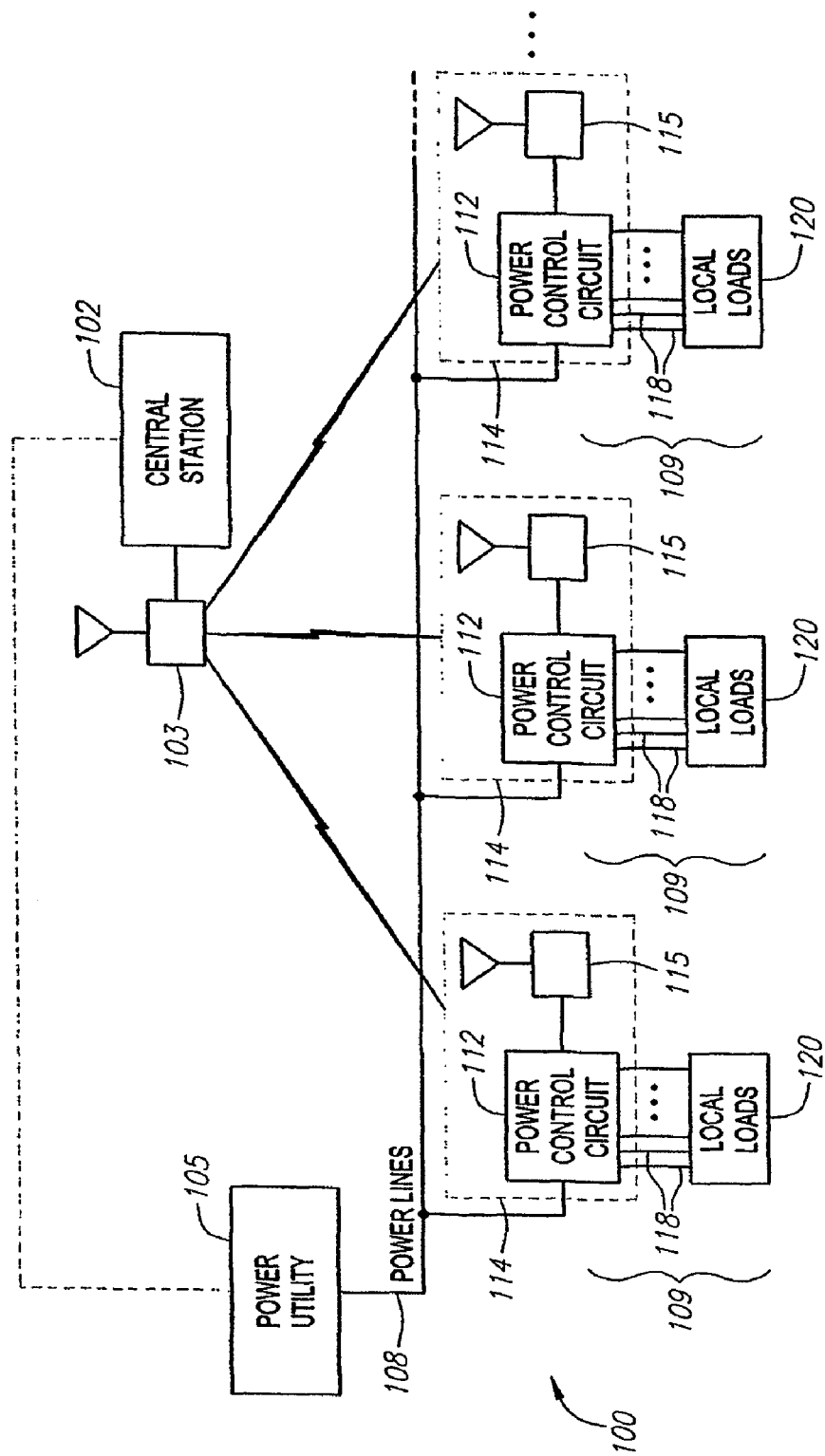
FIG. 1 is a block diagram of a power management system according to one embodiment as disclosed herein.

FIG. 1 is a block diagram illustrating an example of a power management system 100 in which local energy control units, according to various embodiments as disclosed herein, may be utilized. As shown in FIG. 1, a power utility 105 distributes power to a variety of customer loads 120 at local sites 109, over power lines 108. The power utility 105 is illustrated generically in FIG. 1, and may encompass one or more power generation stations or other power sources, substations, transformers, power lines, and any other equipment which is utilized in generating and distributing power to customers, as is well known in the art. The local sites 109 may include industrial/commercial users (which typically draw power in the neighborhood of 4.16 kV to 34.5 kV) and residential or light commercial users (which typically draw power in the neighborhood of 120 and/or 240 Volts), although more generally they include any set of related electrical loads for which control of energy distribution is desired. Each of the customer loads 120 thus generally comprises one or more local electrical loads (not individually shown in FIG. 1).

At each local site 109, a wireless energy control unit 114 controls the delivery of power from the power lines 108 to the customer loads 120. A central station 102 transmits energy control commands, via a communication unit 103 (which preferably comprises at least a transmitter but may also include a receiver for two-way communication), to the local wireless energy control units 114 located at the various local sites 109. Each of the wireless energy control units 114 may comprise a communication unit 115 (preferably comprising at least a receiver but may also possibly a transmitter for two-way communication) and a power control circuit 112 for, among other things, interpreting the power control commands received by the communication unit 115 and acting thereon. At each local site 109, as explained further herein, the power control circuit 112 receives the energy control commands via the communication unit 115 and selectively blocks power to one or more individual electrical loads at the local site 109, by selectively engaging or disengaging various local power distribution lines 118 at the local site 109.

The central station 102 may transmit energy control commands to the local sites 109 using any suitable communication protocol or technique. The communication may be either one-way or two-way. In a preferred embodiment, the communication unit 103 comprises a radio frequency (RF) transmitter, and, in such an embodiment, the central station 102 preferably broadcasts energy control commands over radio frequencies using available sidebands (e.g., FM sidebands) and/or using frequency shift keying (FSK) transmission. However, other wireless communication techniques or protocols—for example, spread spectrum or wideband communication techniques or protocols—may also be used. While the central station 102 is illustrated as a single feature in FIG. 1, it will be understood that the transmissions from the central station 102 may be relayed over a variety of communication equipment and facilities, including communication substations and landlines.

An advantage of wireless transmission of energy control commands is that a relatively wide area can be covered relatively economically, without the need, for example, for continuous wired landlines from the central station 102 to the various local sites 109, or the need for transmitting data over noisy power lines which are generally subject to local and other sources of interference.

Figure 2:
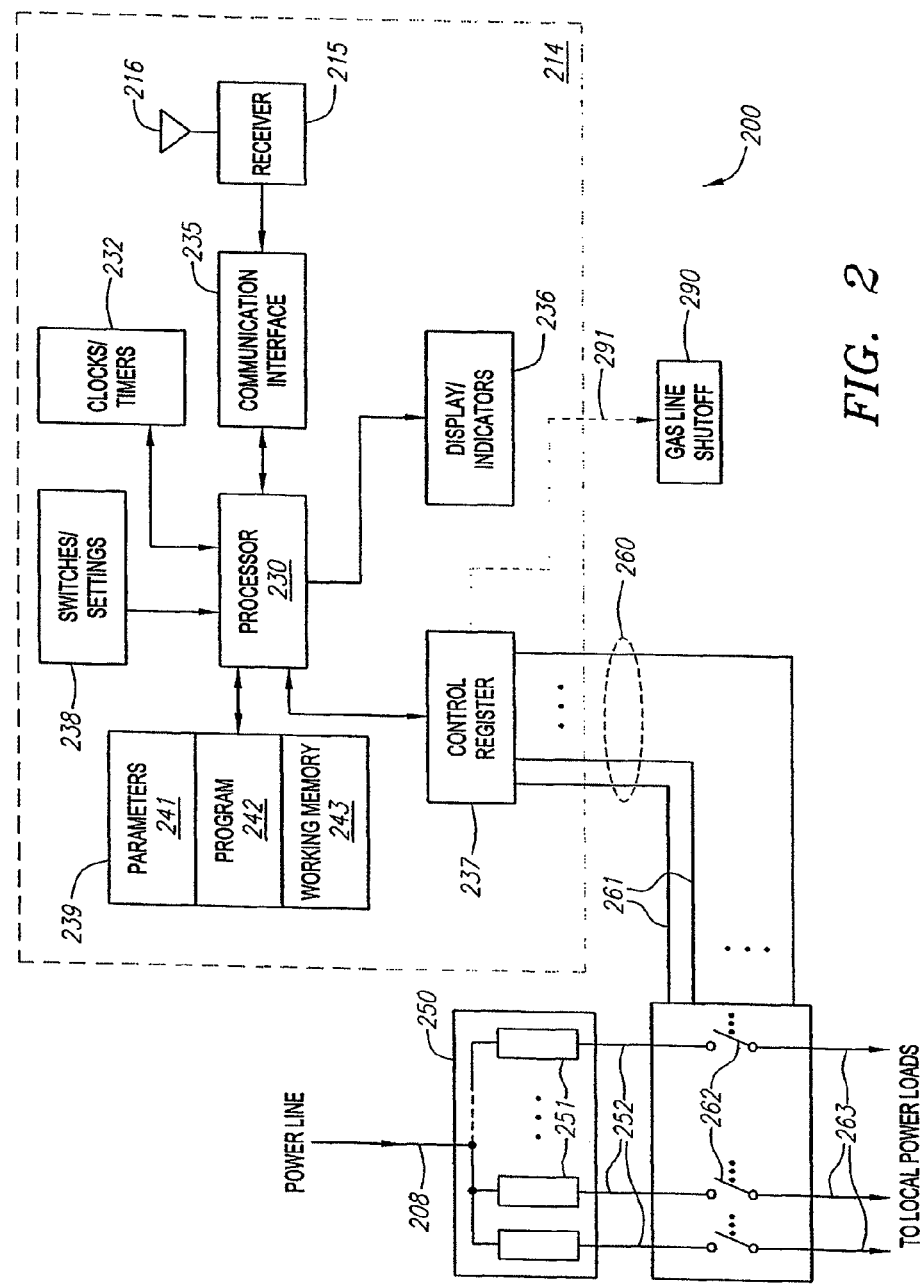
FIG. 2 is a block diagram of a local energy control system as may be used, for example, in accordance with the power management system of FIG. 1 or other power management systems.
Figure 4:
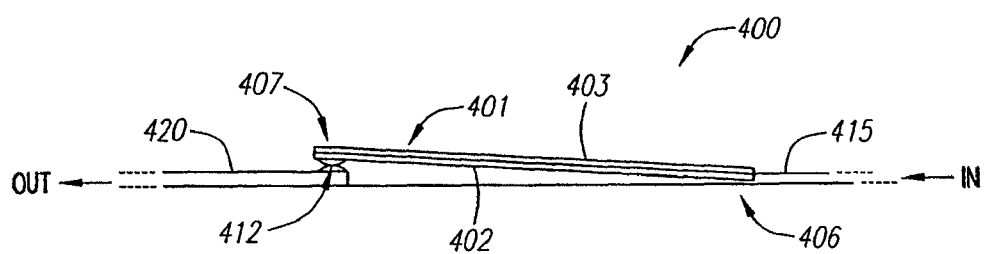
FIG. 4 is a conceptual diagram of a bimetal-based circuit breaker as known in the art.

In a preferred embodiment, each wireless energy control unit 114 provides the customer with the ability to pre-select which electrical loads, if any, at a particular local site 109 should be disengaged in response to command messages from the central station 102. This ability may be described in more detail with reference to FIG. 2, which is a block diagram of a local energy control system 200, as may be utilized in connection with the power management system 100 shown in FIG. 1 (and may be loosely correlated to the various components shown as local sites 109). As shown in FIG. 2, the local energy control system 200 preferably comprises a wireless energy control unit 214 having a number of control lines 261 which carry signals for controlling the on/off states of controllable switches 262. The controllable switches 262 are selectively disconnected and re-connected in order to effectively shut down and re-energize various local loads which are supplied by individual power lines 263 split off from a main power line 208, which may bring incoming power from a power utility or other primary power source. The controllable switches 262 are preferably connected in series with, and interposed between, a bank of circuit breakers 251 (of the type, for example, as may typically be found at a local residence or commercial site) and the various local power loads. An example of one type of circuit breaker is illustrated in FIG. 4, and described in more detail later herein. The circuit breakers 251 generally act to prevent excessive current from being drawn from the incoming power line 208, thereby preventing hazardous conditions that may result, for example, from a short circuit or other such condition at the local site. Once a circuit breaker 251 has "tripped", thereby stopping power flow to its respective local power load, it typically may be reset by, e.g., activating a manual switch. While a preferred embodiment of the local energy control system 200 involves controllable switches 262 interposed between circuit breakers 251 and the output power lines 263 carrying individual power signals to various local loads, it will be appreciated that, in other embodiments, the circuit breakers 251 may be omitted, or other electrical components (e.g., fuses) may be present instead of or in addition to the circuit breakers 251.

The wireless energy control unit 214 preferably comprises built-in intelligence sufficient to receive commands electronically, and to disconnect and re-connect the controllable switches 262 in response thereto. The wireless energy control unit 214 shown in FIG. 2 comprises a communication unit 215, which preferably includes a receiver, and may also include a transmitter for two-way communication. The communication unit 215 further comprises an antenna 216 for receiving wireless commands transmitted from a remote location (e.g., the central station 102), the configuration and nature of the antenna 216 being determined largely by the nature of the particular wireless communication technique, according to principles of antenna design well known in the field of wireless communications. The wireless energy control unit 214 also preferably includes a control circuit portion generally comprising one or more components capable of receiving the power control commands received via the communication unit 215, and selectively controlling the controllable switches 262 in response thereto. In a preferred embodiment, the control circuit portion comprises a communication interface 235, a processor 230, one or more clocks or timers 232, a memory 239, a set of switch or setting inputs 238, a display and/or indicator(s) 236, and a control register 237, and may also include the control lines 261 and controllable switches 262.

In operation, the communication interface 235 of the wireless energy control unit 214 receives and, if desired, interprets and/or temporarily stores commands or other messages received from a remote transmitter via the communication unit 215. The communication unit 215 may output data in a format dependent upon the wireless communication technique or protocol employed and the level of sophistication of the receiving electronics. For example, the communication unit 215 may output a stream of digital data bits at various intervals when information is received from the remote transmission source. The communication interface 235 may interpret the data output from the communication unit 215 and may be configured, for example, to recognize which data is valid and which messages are directed to the particular wireless energy control unit 214. Messages transmitted from the remote transmission source (e.g., central station 102) may, for example, and as further described herein, be addressed or encoded so that only certain wireless energy control units (e.g., those in a specific geographic area) react to the commands or messages being sent.

When information arrives via the communication unit 215 and communication interface 235 that appears to be valid, the processor 230 may become aware of the received information through any suitable means. For example, the processor 230 may receive an interrupt signal from the communication unit 215, or may poll the communication unit 235 regularly to determine if information has arrived. In some embodiments, to conserve energy, it may be advantageous to allow the processor 230 and other control circuitry to be placed in a "sleep" state, wherein the circuitry of the wireless energy control unit 214 is essentially shut down, except for the communication unit 215 and communication interface 235 and other essential circuitry, if any, by disengaging the power supply to the wireless energy control unit 214. The processor 230 and other control circuitry is reactivated or "awakened" by re-engaging the power supply, which may be carried out by special internal power supply management circuitry (not shown) when the communication interface 235 detects that information has been received via the communication unit 215, or upon some other event requiring attention (e.g., programming of settings, display update, periodic status check, etc.). In this manner, the wireless energy control unit 214 may use only minimal power when not responding to commands or performing some other necessary activity.

When the processor 230 has been informed that transmission has been received from the remote transmitter, the processor 230 attempts to respond to any commands or other messages that may have been received. The response of the processor 230 generally may depend upon certain stored parameters and other configuration information or programming instructions stored at the wireless energy control unit 214. In this regard, the memory 239 may be advantageously comprised of different logical and/or physical portions, including a working memory portion 243, a program instruction storage portion 242, and a parameter storage portion 239. Generally, the program instruction storage portion 242 and parameter storage portion 239 comprise non-volatile memory (such as EEPROM), while the working memory portion 242 comprises volatile memory (e.g., RAM). In certain embodiments, the memory 239 may also have a backup DC power source (e.g., battery) to help prevent loss of stored information in case the main power source is interrupted.

The program instructions stored in the program instruction storage portion 242, the parameters stored in the parameter storage portion 239, and/or the set of switch or setting inputs 238 largely dictate the response of the wireless energy control unit 214 to commands or other messages received from the remote source, collectively providing rules or logic by which the wireless energy control unit 214 determines which controllable switches 262 to disconnect or re-connect. In a preferred embodiment, the wireless energy control unit 214 is user-configurable, such that the order in which the controllable switches 262 are disengaged or re-connected can be determined individually for each local site 109. In one aspect, the wireless energy control unit 214, in certain embodiments, provides a capability for establishing a priority order by which the controllable switches 262 are disengaged or re-connected. The priority order may be set by various switch or setting inputs 238 which can be manually adjusted. The switch or setting inputs 238 may take any of wide variety of forms. As but one example, each controllable switch 262 may be associated with a multi-position switch (not shown) providing one of the switch or setting inputs 238. Each position of the multi-position switch may indicate whether the associated controllable switch 262 will be triggered in response to an alert stage of a particular level, as described in more detail hereinafter. For example, in a system wherein three possible alert stages exist, the multi-position switch may have four positions, three of which correspond to first-stage, second-stage, and third-stage alert conditions, while the fourth position indicates that the associated controllable switch 262 will not respond to any of the three alert stages. The number of switch positions of the multi-position switches may be determined, at least in part, by the number of alert stages which are possible.

Alternatively, the response of the controllable switches 262 to various alert stage conditions may be software-programmable, using various button/switch inputs (which may be provided as part of the switch or setting inputs 238) for configuring the priority ordering of the controllable switches 262. As but one example, a user may be permitted to cycle through a routine which addresses each of the controllable switches 262 in sequence, and for each controllable switch 262, allows the user to enter the desired response to an alert stage condition. The programming information may be displayed on, e.g., a small LCD display or other type of visual display (which, in FIG. 2, may generally be represented by display/indicators 236). The wireless energy control unit 214 may optionally also have a set of indicators (pictorially represented in FIG. 2 by display/indicators 236) indicating, on an individual basis, which of the controllable switches 262, if any, are disengaged at a given moment in time. Such indicators may be embodied, for example, as LEDs or other low-power light elements. The display/indicators 236 may also indicate (by, e.g., a special LED indicator, or a flashing message on a small LCD display, and/or an occasional audible sound) that an "early warning" message has been received from the central station 102 indicating that a power alert is imminent.

In some embodiments, the wireless energy control unit 214 may be configured with a programmable timer function, allowing the priority by which the electrical loads are disengaged to automatically be adjusted based upon certain timing considerations—for example, the particular day of the week, time of day, and so on. Such timing may be programmed by the user in the same manner as setting up the initial priority scheme by which the controllable switches 262 will be disengaged upon receipt of messages requiring such from the central station 102. The parameter storage portion 241 of the memory 239 may store timing parameters which cause the programmable priority of the controllable switches 262 to change at certain specific times. The memory 239 may be configured to record the states of the various controllable switches 262, or other system parameters, at various points in time. The memory 239 may, in certain embodiments, be triggered so as to record information only after an event which causes one or more electrical loads to be disengaged, or some other event of significance.

As further illustrated in FIG. 2, a control register 237 may be provided to store the current "command" status for the controllable switches 262. In a particular embodiment, for example, each bit of the control register 237 may hold a command bit whose binary state ("1" or "0") indicates the on/off status of the associated controllable switch 262. The wireless energy control unit 214 may also be used to control other resources in the local area—for example, a gas line shutoff 290. The mechanism for the gas line shutoff 290 may likewise have an associated on/off status/command bit in the control register 237.

Figure 3:
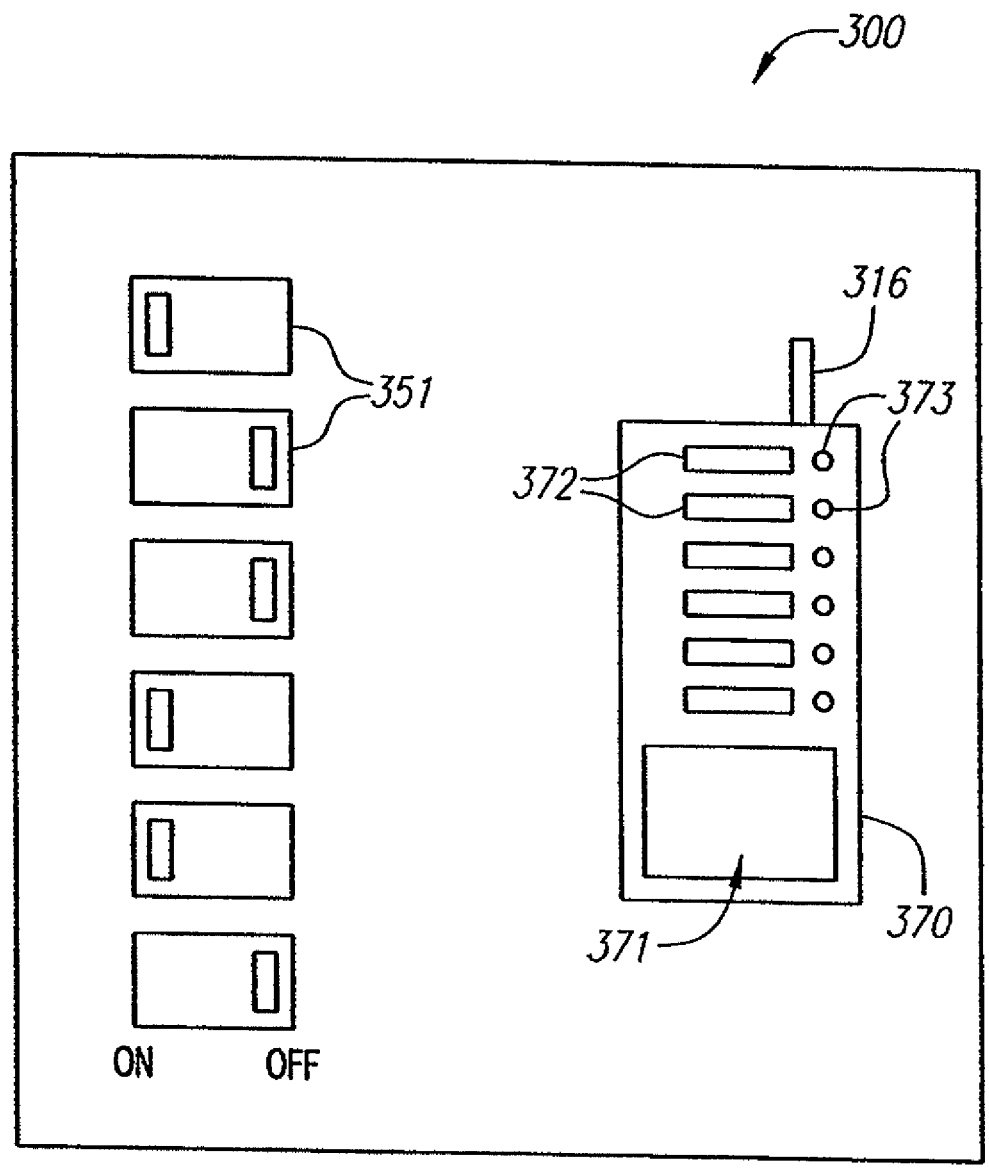
FIG. 3 is a diagram illustrating physical placement of certain components utilized in one embodiment of a local energy control system.

FIG. 3 is a diagram illustrating physical placement of certain components utilized in one embodiment of a local energy control system. As shown in FIG. 3, a wireless energy control unit 370 may physically be attached to or placed within a circuit box 300. The circuit box 300 may comprise a set of on/off or reset switches 351 for manually resetting circuit breakers (e.g., circuit breakers 251 shown in FIG. 2) and/or for disengaging, on an individual basis, the electrical loads connected to particular circuit breaker. The switches 351 in FIG. 3 are shown in various on and off states. Wires output from the circuit breakers for connection to the various electrical loads may be connected via the wireless energy control unit 370 and, in particular, through the various controllable switches (e.g., controllable switches 262 shown in FIG. 2) thereof. In the particular example illustrated in FIG. 3, the wireless energy control unit 370 is also shown with a set of manual switches 372 for selecting which controllable switches will respond to remotely issued power management instructions and in which general priority. If only one power alert stage is used by the power management system 100, then the manual switches 372 can serve their function with only two switch positions, the first position indicating that the controllable switch will not turn off (i.e., disconnect its electrical load) when the power alert stage is entered, and the second position indicating that it will turn off when the power alert stage is entered.

On the other hand, if the power management system 100 has a tiered set of power alert stages, then a more sophisticated set of switch settings may be employed. For example, if three power alert stages are used in the power management system 100 (not including a "black-out" stage or other alert stages in which the local power control circuits are not involved), then each of the manual switches 372 may have four positions, the first three positions indicating which power alert stage is required before the corresponding controllable switch will turn off (i.e., disengage its electrical load), and the fourth position indicating that the corresponding controllable switch will not turn off in response to any of the power alert stages. The fourth position may be useful for managing electrical loads which the customer considers critical or essential and therefore does not want to be disengaged if it can be avoided.

Light indicators (e.g., LEDs) 373 next to each of the manual switches 372 may be used to indicate whether any of the controllable switches have, in fact, disengaged their respective electrical loads in response to a message from the central station causing the wireless energy control unit 370 to enter a power alert stage level requiring or requesting local power reduction. A display and/or interface 371 may be used to present text messages, either pre-stored in the wireless energy control unit 370 or received from the central station, or, if buttons or suitable means are provided, to allow programming of various capabilities provided by the wireless energy control unit 370.

As previously indicated with respect to the embodiment shown in FIG. 2, the wireless energy control unit 370 (and hence, the controllable switches) may be placed either downstream or upstream from the circuit breaker switches 351, since in either case the wireless energy control unit 370 will be able to function so as to disengage the incoming power wires from the local electrical loads. In one aspect, the wireless energy control unit 370 provides a compact, efficient and practical means to regulate local power consumption, that is minimally intrusive to the customer site because it can be integrated with a common circuit box 300 or electrical box of similar size, therefore requiring minimal retrofitting of existing establishments.

In alternative embodiments, the wireless energy control unit 370 can be placed in series with fuses, as opposed to or in addition to circuit breakers.

In various embodiments, the power management system 100 operates to reduce or curtail overall customer power demand for an indefinite amount of time by issuing commands from a central source (i.e., the central station 102) which cause the power control circuits 112 at local sites 109 individually to disengage selected electrical loads 120. In a preferred embodiment, the central station 102 issues power alert stage declarations based upon the amount of power demand reduction needed to maintain operation of the power utility 105 within tolerable limits. According to one example, one or more power alert stage levels are defined for the power management system 100, and the central station 102 changes the power alert stage level by wirelessly broadcasting the alert level to the wireless communication units 115 at the various local sites 109. As the consumer power demand increases to threshold levels at which action is deemed necessary, the central station 102 broadcasts the power alert stage level appropriate to the current conditions. As the customer power demands decrease to more tolerable levels, the central station 102 may then broadcast power alert stage levels that indicate some or all of the electrical loads 120 may be re-engaged. The total customer power demand level at which various power stage alerts are declared may be fixed at specific threshold levels, or at specific percentages of overall power capacity (which may fluctuate dynamically—e.g., day be day, hour by hour, or even more rapidly). Alternatively, the power alert stage messages may be issued in response to manual commands entered by authorized personnel associated with the power utility 105 and/or central station 102, thus allowing human judgment to be involved the decision, or a combination of automatic and manual techniques may be used. Any number of power alert stage levels may be employed, depending upon the desired complexity of the power management system 100.

Figure 11:
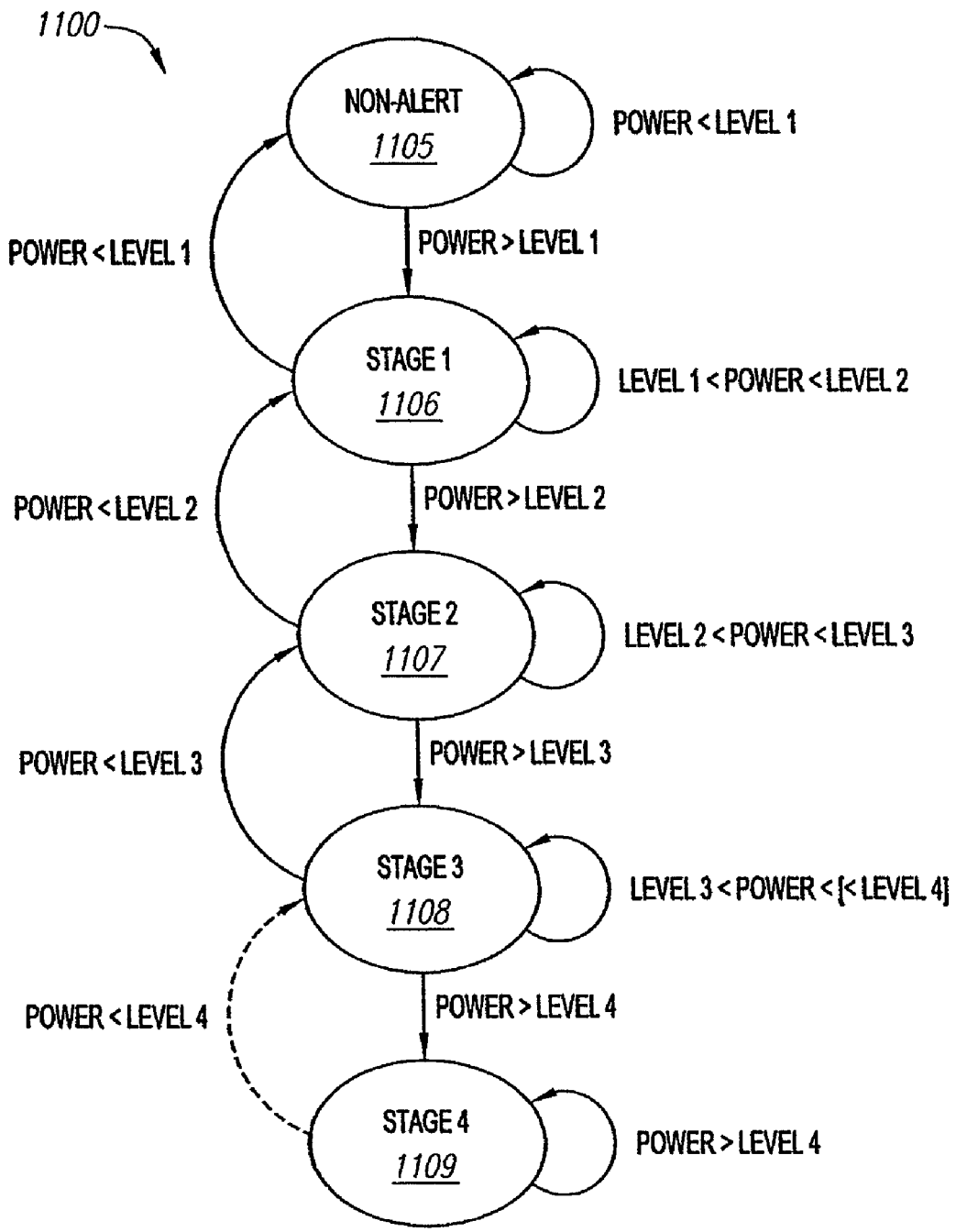
FIG. 11 is a state diagram illustrating the transition between various alert stages, according to one process as disclosed herein.

According to one example, the power management system 100 may have four power alert stage levels—three of which cause the local sites 109 to reduce their power consumption in response to commands received from the central station 102, and a fourth power alert stage level which requires additional steps to be taken (e.g., intentional brown out or black out of a geographical region). FIG. 11 is a state diagram 1100 illustrating the transition between various power alert stages, according to such an example. As illustrated in FIG. 11, the state diagram 1100 includes a plurality of states 1105 through 1109 corresponding to different power alert stage levels. When total customer power demand is in a tolerable range (i.e., the total customer power demand level is below a specified first threshold level designated LEVEL1), the power management system 100 is kept in a non-alert state 1105. When the total customer power demand level exceeds the first threshold level (i.e., LEVEL1), the power management system 100 enters a first stage alert state 1106, whereupon the central station 102 broadcasts a wireless message to the local wireless communication units 115 indicating that a first stage power alert has been declared. In response, the power control circuits 112 at the local sites 109 selectively disengage various local electrical loads 120, thus reducing the overall customer power demand to keep the total energy usage within a tolerable level. The power utility 105 may measure the extent to which the power demand has dropped and convey this information to the central station 102 (or other processing center) for use in future determinations of power alert stage levels. For example, the central station 102 (or other processing center) may treat the current total power demand level as including the amount by which the total power demand level dropped as a result of issuing the power alert stage warning, because retracting the power alert stage warning at any point would presumably result in the re-engagement of the previously disengaged local electrical loads 120 and consequent increase in total power demand. Therefore, when the total customer power level is shown in FIG. 11 as being compared to various threshold levels, preferably the power management system 100 takes into account the effect of the disengaged local electrical loads 120.

So long as the total customer power demand stays above the first demand threshold LEVEL1 but below a second demand threshold LEVEL2, the power management system 100 stays in the first stage alert state 1106. However, if the total customer power demand continues to increase such that it passes the second demand threshold LEVEL2, the power management system 100 then enters a second stage alert state 1107, and the central station 102 wirelessly broadcasts a message to the wireless communication units 115 at the various local sites 109 indicating that a second stage power alert warning has been declared. On the other hand, however, if the total customer power demand drops back below the first demand threshold LEVEL1, the power management system 100 returns to the non-alert state 1105, whereupon the central station 102 wirelessly broadcasts a message to the wireless communication units 115 at the various local sites 109 indicating that the first stage power alert is no longer in affect, and that the power management system 100 is returning to the non-alert state 1105.

So long as the total customer power demand stays above the second demand threshold LEVEL2 but below a third demand threshold LEVEL3, the power management system 100 stays in the second stage alert state 1107. However, if the total customer power demand continues to increase such that it passes the third demand threshold LEVEL3, the power management system 100 then enters a third stage alert state 1108, and the central station 102 wirelessly broadcasts a message to the wireless communication units 115 at the various local sites 109 indicating that a third stage power alert warning has been declared. On the other hand, if the total customer power demand drops back below the second demand threshold LEVEL2, the power management system 100 returns to the first stage alert state 1106, whereupon the central station 102 wirelessly broadcasts a message to the wireless communication units 115 at the various local sites 109 indicating that the second stage power alert is no longer in affect, and that the power management system 100 is returning to the first stage alert state 1106.

Similarly, so long as the total customer power demand stays above the third demand threshold LEVEL3 but below a fourth demand threshold LEVEL4, the power management system 100 stays in the third stage alert state 1108. However, if the total customer power demand continues to increase such that it passes the fourth demand threshold LEVEL4, the power management system 100 then enters a fourth stage alert state 1109, whereupon additional steps are taken (e.g., regional black out or brown out). No wireless commands are necessary in such a situation; however, a blackout or brownout warning message may, if desired, be transmitted by the central station 102, so that customers at the local sites 109 can obtain a warning before a blackout or brownout occurs. Optionally, the approximate amount of time until the blackout or brownout may also be transmitted by the central station 102, and the time until the upcoming outage event may be displayed by the local power control circuits 112 so that the customers might take whatever steps are desired in such a situation. When the total customer power demand drops back below the third demand threshold LEVEL3, the power management system 100 returns to the second stage alert state 1107, whereupon the central station 102 wirelessly broadcasts a message to the wireless communication units 115 at the various local sites 109 indicating that the third stage power alert is no longer in affect, and that the power management system 100 is returning to the second stage alert state 1107.

As an alternative way of achieving a similar result, a single power usage threshold may be used, and the amount by which customer power demand drops in response to each power alert stage level is not necessarily considered in the calculation of the next power alert stage level. According to this alternative embodiment, as each power alert stage level is declared, the total customer power demand level is expected to drop due to the collective effect of the various energy control units 114 at the various local sites 109. Therefore, the same power usage threshold may be used for each power alert stage level while allowing the beneficial operation of the power management system 100. For example, the power usage threshold may be set at 96% of total power capacity. When total customer power demand reaches the power usage threshold, a first stage power alert warning message is transmitted to the wireless energy control units 114, which disengage some of the electrical loads 120. As a result, total customer power demand will drop by some amount (for example, five percent). The power usage threshold may remain at 96% of capacity. When total customer power demand reaches 96% again during the first power alert stage level, the central station 102 may then transmit a second stage power alert warning message to the wireless energy control units 114, thereby causing another drop in total customer power demand. This cycle may be repeated for entry into the third and fourth power alert stage levels.

The process 1100 may be implemented in an automated system using, for example, one or more computer processors to carry out, which may be located at the central station 102 or elsewhere, in either a centralized or distributed architecture. The threshold levels between the various power alert stages may be programmable. A hysteresis technique may be used such that when the customer power demand is near a threshold level, the system does not switch back and forth between two different power alert stage levels too quickly. In other words, when the customer power demand is increasing, the threshold level may be increased by a hysteresis amount, and as soon as the threshold level (plus the hysteresis amount) is passed and a new alert stage level entered, the threshold level may be decreased by a hysteresis amount so that as the customer demand level decreases it needs to drop below the threshold level minus the hysteresis amount in order to switch back to the lower power alert stage level. Also, since switching to the next power alert stage level is expected to cause the total customer power demand to drop rather suddenly (although such an effect can be mitigated by adding the drop-off amount into the total customer power demand level used for power alert stage calculations, as alluded to above), a hysteresis technique is helpful to prevent a rapid switch back to the previous power alert stage level as soon as the local sites 109 start shedding their selected electrical loads 120.

Applying the techniques illustrated in FIG. 11, a power utility 102 may be able to control dynamically the total customer power demand, and thus reduce peak customer power consumption when necessary to avert a power crisis. By providing multiple alert stage levels, such a power management technique allows some granularity in selecting the amount of customer power to be reduced, and places the minimal burden necessary on the customers.

Further description will now be provided concerning various ways in which a local power control circuit may selectively disconnect or re-connect controllable switches in order to effectuate control of local power consumption. This description will focus on the embodiment of a local energy control system 200 illustrated in FIG. 2, but the principles and concepts are applicable to other embodiments as well. Assuming a power management system in which different power alert stages are defined, when the local energy control system 200 receives a message to enter the next highest power alert stage, the wireless energy control unit 214 examines the switch or setting inputs 238 and/or stored parameters 241 in order to determine which controllable switches 262 to disengage. In the example in which the switch or setting inputs 238 are established by multi-position switches such as previously described (with each switch position corresponding to the power alert stage at which the corresponding controllable switch 262 will respond by shedding its respective electrical load), the processor 230 may simply examine the position settings of each of the multi-position switches to determine whether or not the corresponding controllable switch 262 should be set to an open position so as to disconnect its respective electrical load. When a message from the central station 102 instructs the wireless energy control unit 214 to enter a first power alert stage, for example, the processor 230 checks the switch setting of each of the multi-position switches to determine whether the switch position indicates a response to the first power alert stage. When a message from the central station 102 instructs the wireless energy control unit 214 to enter a second power alert stage, the processor 230 checks the switch setting of each of the multi-position switches to determine whether the switch position indicates a response to either the first power alert stage or second power alert stage. When a message from the central station 102 instructs the wireless energy control unit 214 to enter a third power alert stage, the processor 230 checks the switch setting of each of the multi-position switches to determine whether the switch position indicates a response to either the first power alert stage, second power alert stage or third power alert stage. In each case, when the processor 230 determines that a controllable switch 262 should respond to the current power alert stage level, the processor 230 issues the appropriate command in the control register 237, which in turn causes the corresponding controllable switch 262 to open and disengage its electrical load.

In an alternative embodiment, the switch or setting inputs 238 indicate a relative priority for disengaging the controllable switches 262 in response to remote commands from a central station 102. In such an embodiment, an indeterminate number of power alert stages may be utilized. When the first power alert stage message (or power reduction command) is received, the controllable switch 262 with the lowest priority is opened and its electrical load thereby disengaged. With each subsequent power alert stage message (or power reduction command), the next highest priority controllable switch 262 is opened, until, at a maximum, all of the controllable switches 262 are opened. However, the switch or setting inputs 238 may also indicate that certain controllable switches 262, which may correspond to, e.g., critical or essential electrical devices, are to remained closed continuously and never opened.

Alternatively, if the wireless energy control unit 214 is connected to the output reading from a local power meter so that it can dynamically monitor how much power is being used at the local site, the wireless energy control unit 214 may be instructed (either directly or indirectly), or pre-programmed, to reduce local power consumption by a specified percentage or amount. The wireless energy control unit 214 may then make an initial determination (according to techniques described above, for example) of which electrical loads to shed and, thus, which controllable switches 262 initially to open. The wireless energy control unit 214 may then monitor the local power usage to determine if additional controllable switches 262 need to be opened to either reach the desired target energy usage level or maintain energy usage at the desired target level. The wireless energy control unit 214 may open up the additional controllable switches 262 in the priority that is indicated by the switch or setting inputs 238.

As the level of the power alert stages is decreased, the wireless energy control unit 214 may close the controllable switches 262 and thereby re-engage the electrical loads in the reverse order in which the controllable switches 262 were opened. The wireless energy control unit 214 may, if desired, impose a time delay between the re-connection of any two controllable switches 262 to reduce the possibility of power spikes or similar undesirable effects.

Figure 12:
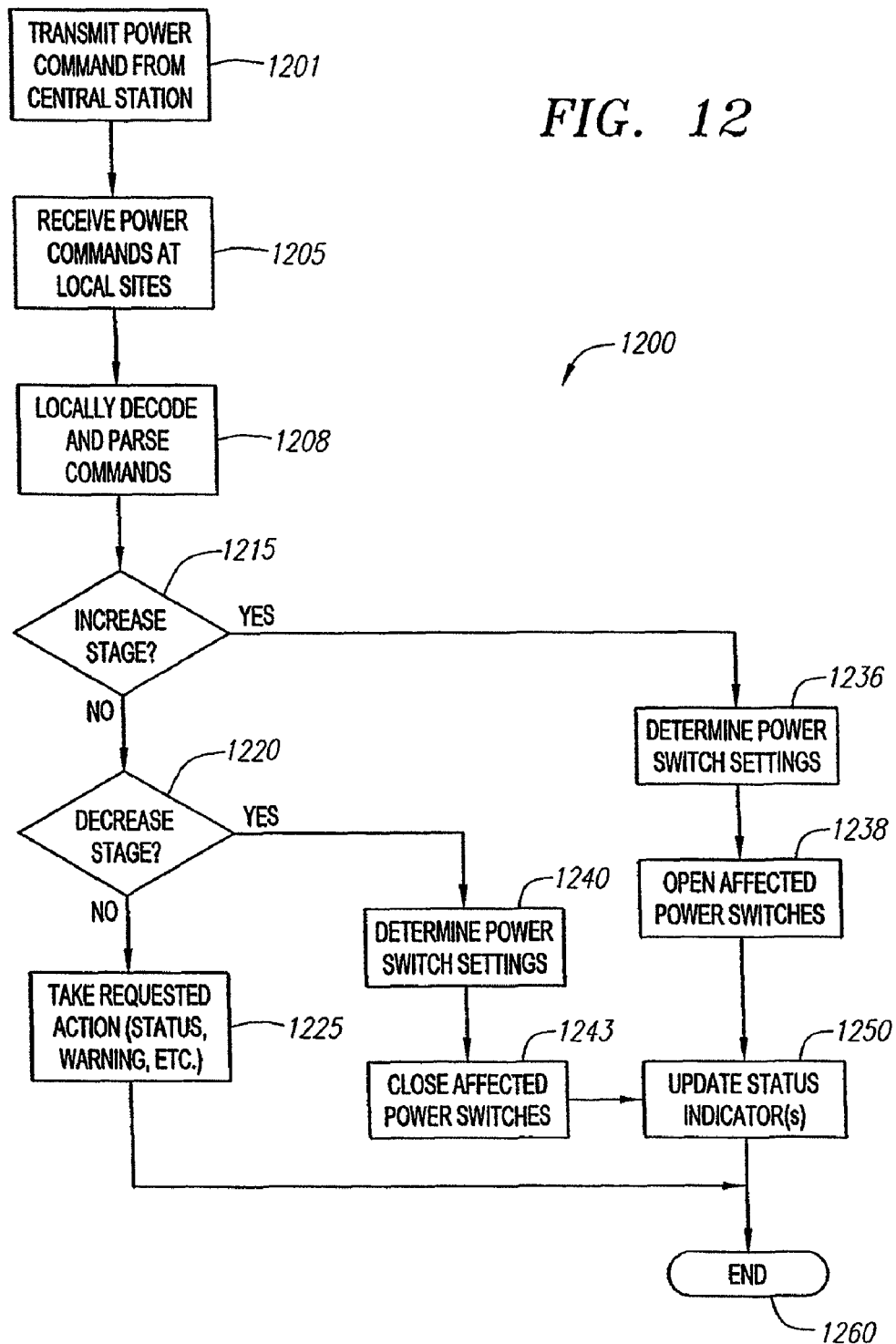
FIGS. 12 and 13 are process flow diagrams illustrating various steps involved in transitioning between different alert stages, according to two different embodiments as disclosed herein.
Figure 13:
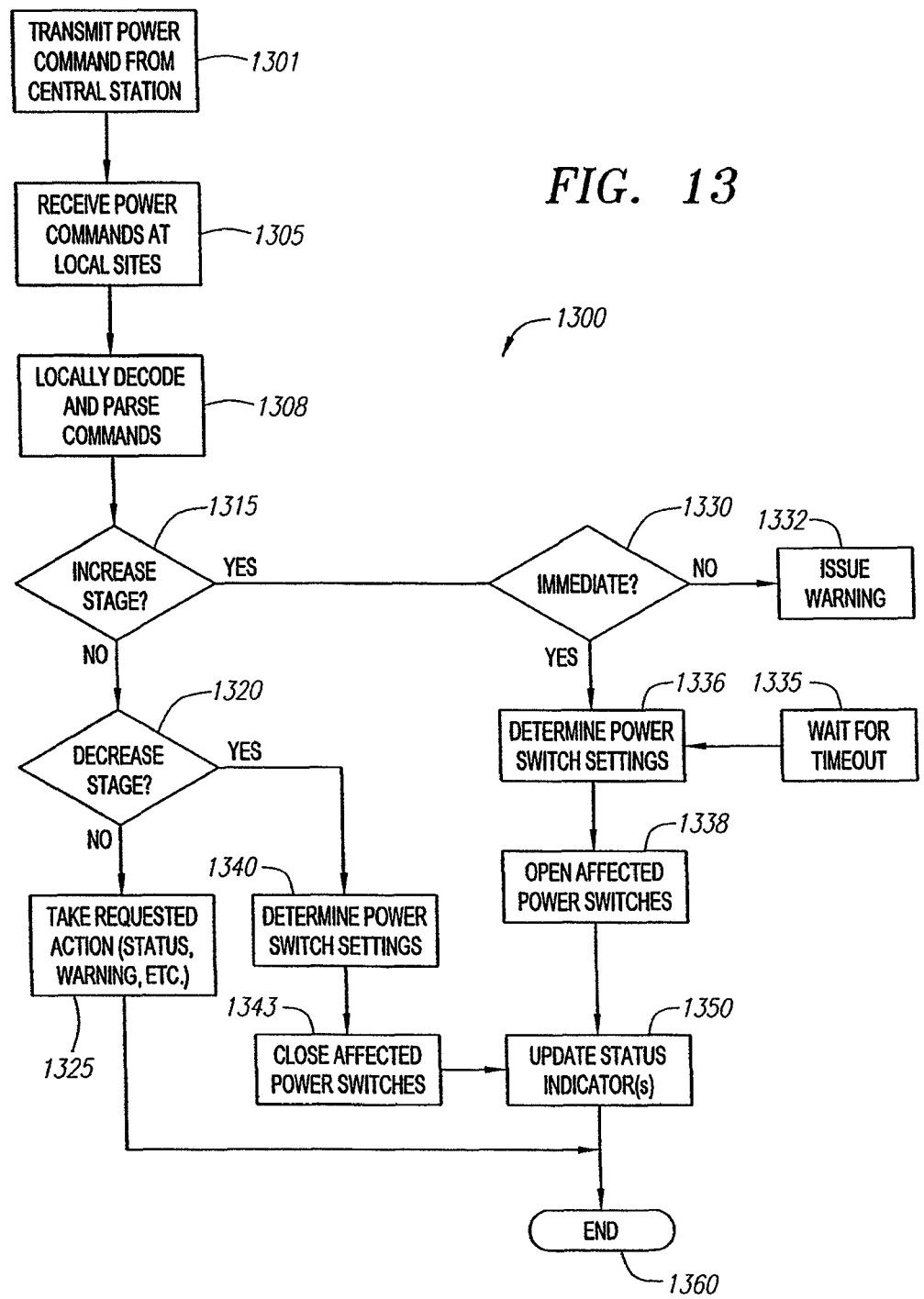

FIGS. 12 and 13 are process flow diagrams illustrating various steps involved in transitioning between different alert stages, according to two different embodiments as disclosed herein. While the processes in FIGS. 12 and 13 are described below for convenience with reference to the power management system embodiment shown in FIG. 1, it will be understood that the principles and concepts are applicable to other power management system embodiments as well. Turning first to FIG. 12, a process 1200 for power management in accordance with a first embodiment is illustrated. In the process 1200 shown in FIG. 12, it is assumed that the central station 102 has already determined, based upon the criteria used to make such a determination, that a message is to be transmitted wirelessly to the various local sites 109 in order to adjust their power consumption (or, in certain cases, for some other purpose). Thus, in a first step 1201, the central station 102 transmits a message (or series of messages), via its wireless communication unit 103, to the wireless communication units 115 at the various local sites 109.

The wireless transmission from the central station 102 may take any of a variety of forms. For example, the wireless transmission may comprise a broadcast transmission intended for receipt at all of the local sites 109. Alternatively, it may comprise a broadcast transmission intended for receipt at only certain specified local sites 109. In this regard, the local sites 109 may, if desired, be organized into different groups, according to any logical criteria, such as geographic region, residential/commercial (possibly with different sub-categories of residential and/or commercial), average usage, etc., or any combination thereof. Local sites 109 in a particular group may be instructed by the central station 102 through broadcast messages which are specifically targeted for that group. Each group of local sites 109 may, for example, be assigned a unique group address or group instruction code, and each local site 109 then responds only to its unique group address or group instruction code. Alternatively, or in addition, each group of local sites 109 may be assigned a unique frequency band or sub-band or a unique encoding scheme, and each local site 109 would then have its wireless communication unit 115 attuned to its unique frequency band or sub-band or configured to receive and decode messages according to its unique encoding scheme. In this manner, the central station 102 is provided with increased flexibility of power management, allowing the central station 102 to command all or any group of local sites to curtail power consumption. As one benefit of such an arrangement, the central station 102 may command only a few groups of local sites 109 to curtail power in response to a power demand situation and, only if the amount of power reduced is insufficient, increase the scope of the power reduction request to other groups in gradual steps until the desired amount of power reduction is reached.

In addition to a group address or code for groups of local sites 109, each local site 109 can also be assigned an individual address or code within its group, thereby allowing each local site 109 to be individually commanded if desired. Also, one of the group addresses or codes (or frequency bands or sub-bands, or encoding schemes) may be a systemwide broadcast address or code, allowing the central station 102 to reach all of the local sites 109 through a single command or sequence of commands which are designated with the systemwide broadcast address or code.

Returning now to FIG. 12, in a next step 1205, the wireless communication units 115 at the various local sites 109 receive the message transmitted from the central station 102. In the following step 1208, each local site 109 decodes or otherwise recovers or re-constructs the information in the received message and, if the message is intended for the particular local site 109, parses the received message into any constituent components. If group addressing or coding is used, for example, the power control circuit 112 at a particular local site 109 may obtain group address or code information (e.g., in a specific field) from the received message, and may thereby determine whether the received message is intended for the particular local site 109 by comparing the group address or code in the received message with the local site's own group address or code. The local site 109 may likewise determine whether the received message is a systemwide broadcast message intended for all of the local sites 109 within the power management system 100, by comparing the group address or code with a systemwide broadcast address or code.

Assuming the message is intended for it, the local site 109 parses the message in order to determine the nature of the communication received from the central station 102. As examples of messages that might be received, the local site 109 may receive a message instructing it to enter the next highest stage of power alert, to enter the next lowest stage of power alert, to adjust a parameter, or to take some other action (e.g., display a power alert stage warning message). Various other message types may also be employed. If the received message instructs the power control circuit 112 at the local site 109 to enter the next highest stage of power alert, then, in step 1236, the power control circuit 112 determines which power control switch or switches (such as switches 262 in FIG. 2) should be opened and thereby which local electrical loads 120 to shed. Examples of how this determination may be made are described with respect to FIGS. 2 and 3, and elsewhere herein. In step 1238, the desired power control switch or switches are opened and, in step 1250, the various status indicators (e.g., LEDs) are updated. For example, an LED may be illuminated next to each power control switch that has been disengaged. Other status indication means may also be used; for example, an audible sound may be issued by the power control circuit 112 to indicate to the customer that one or more electrical loads 120 have been temporarily shed.

If, on the other hand, the received message instructs the power control circuit 112 to enter the next lowest stage of power alert, then, in step 1240 (and assuming the power control circuit 112 is not in the non-alert stage), the power control circuit 112 determines which power control switch or switches should be closed and thereby which local electrical loads 120 to re-connect to power lines 108. Examples of how this determination may be made are described with respect to FIGS. 2 and 3, and elsewhere herein. In step 1243, the desired power control switch or switches are closed and again, in step 1250, the various status indicators (e.g., LEDs) are updated. For example, an LED next to each power control switch that has been re-connected may be turned off.

If the received message neither instructs entry into the next highest stage of power alert nor instructs entry into the next lowest stage of power alert, then in step 1225 the message is interpreted by the power control circuit 112 and acted upon. The specific action depends upon the nature of the received message. For example, if the message is a warning that a power alert is expected, the power control circuit 112 may display a message indicated such (along with the amount of time until the expected power alert, if desired) and/or make an audible noise indicating that a message of interest has been received.

If the power control circuit 112 is actively adjusting the power control switches that are opened and closed by, e.g., monitoring power consumption at the local site 109 (via a local meter, for instance), then the process 1200 may be modified such that a feedback loop is effectuated, wherein the power control circuit 112 continuously determines the power control switch settings, adjusts the power control switch settings, and updates the status indicators. Where active monitoring and adjustment of local power consumption occurs, the power control circuit 112 may open and close power control switches at different times at any given power alert stage. The power control circuit 112 may, in such an embodiment, be configured so as to limit the frequency of opening or closing power control switches, so as to minimize inconvenience to the local customer.

FIG. 13 illustrates another process 1300 for power management similar to the process 1200 illustrated in FIG. 12 but with certain modifications. In FIG. 13, steps 1301, 1305 and 1308 are generally analogous to steps 1201, 1205 and 1208 in FIG. 12. Likewise, steps 1336, 1338, 1340, 1343 and 1350 are generally analogous to the corresponding steps illustrated in FIG. 12. However, in FIG. 13, new steps 1330, 1332 and 1335 are added over the process 1200 shown in FIG. 12. The added steps to the process 1300 of FIG. 13 address a situation in which entry into the next highest power alert stage is to be delayed for an amount of time specified by the central station 102. In such a situation, according to the embodiment illustrated in FIG. 13, when the power control circuit 112 has determined that the received message instructs entry into the next highest power alert stage, the power control circuit 112 also derives from the received message an indication of whether entry into the next highest power alert stage is immediate or delayed and, if delayed, the amount of time until the power alert stage is entered. If entry into the next highest power alert stage is immediate, then the process 1300 moves directly to step 1336. If entry into the next highest power alert stage is delayed, then in step 1332 the power control circuit 112 issues a warning, which may take the form of, for example, illuminating a warning light, issuing an audible sound or sound pattern, or the like. The power control circuit 112 then waits for timeout of the delay period, as indicated by step 1335, before moving on to step 1336 after the delay period is over. The power control circuit 112 may use an internal timer or clock to measure the delay period to effectuate the foregoing operation.

Figure 10:
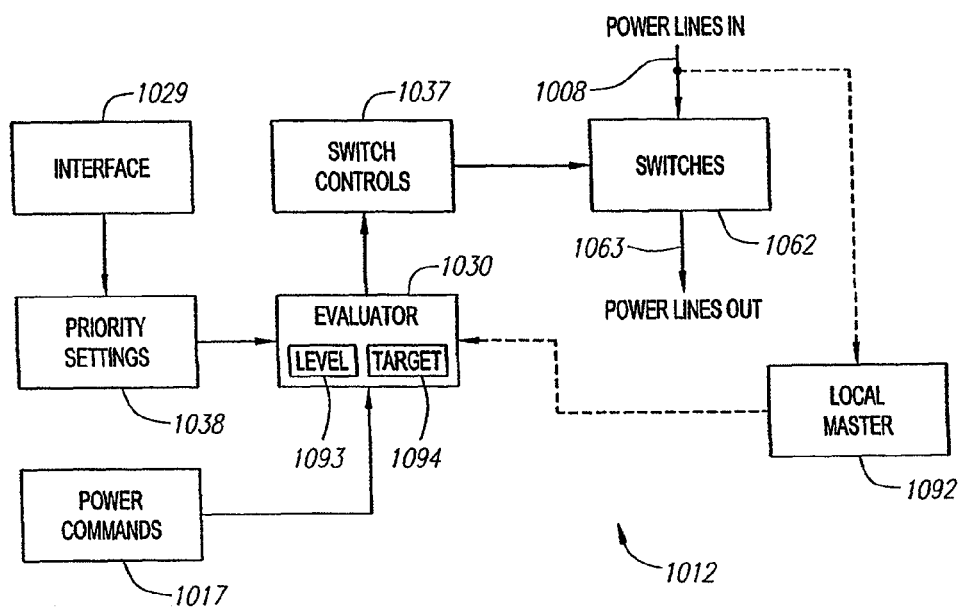
FIG. 10 is a diagram illustrating various components of a local energy control system in relationship to one another.

FIG. 10 is a diagram illustrating various components of a local energy control system 1012 in relationship to one another, in accordance with one embodiment as disclosed herein, illustrating the potential use of feedback from a local meter 1092 for determining, at least in part, operation of the controllable switches 1062. As illustrated in FIG. 10, a set of switch controls 1037 are used to control the settings of a plurality of controllable switches 1062 which, similar to the controllable switches described with respect to FIGS. 2 and 3, allow selective connection and disconnection of local electrical loads. A local power meter 1092 monitors the power drawn on the incoming power lines 1008 (or alternatively, the outgoing power lines 1063), and outputs a power usage measurement signal which is provided to an evaluator 1030 (which may be embodied as a processor operating according to stored program instructions and various inputs). The evaluator 1030 compares the power usage measurement with a power usage target 1094 to determine whether additional ones of the controllable switches 1062 should be opened or closed. The power usage target 1094 is preferably set based upon power alert stage level 1093 of the local energy control system 1012. If the evaluator 1030 determines that, based upon the power usage measurement, local power consumption exceeds the power usage target 1094, then the evaluator 1030 determines which controllable switches 1062 to open or close based upon the priority settings 1038 which, as discussed earlier, can be set manually or programmed via an interface 1029. As power commands 1017 are received from a central station, the evaluator 1030 updates the power alert stage level 1093 and the power usage target 1094 as required. The local energy control system 1012 thereby provides a level of robust control of power consumption at a local site, and can be utilized advantageously in a power management system such as shown in FIG. 1 to effectuate overall power demand reduction when required by a power utility.

Figure 9:
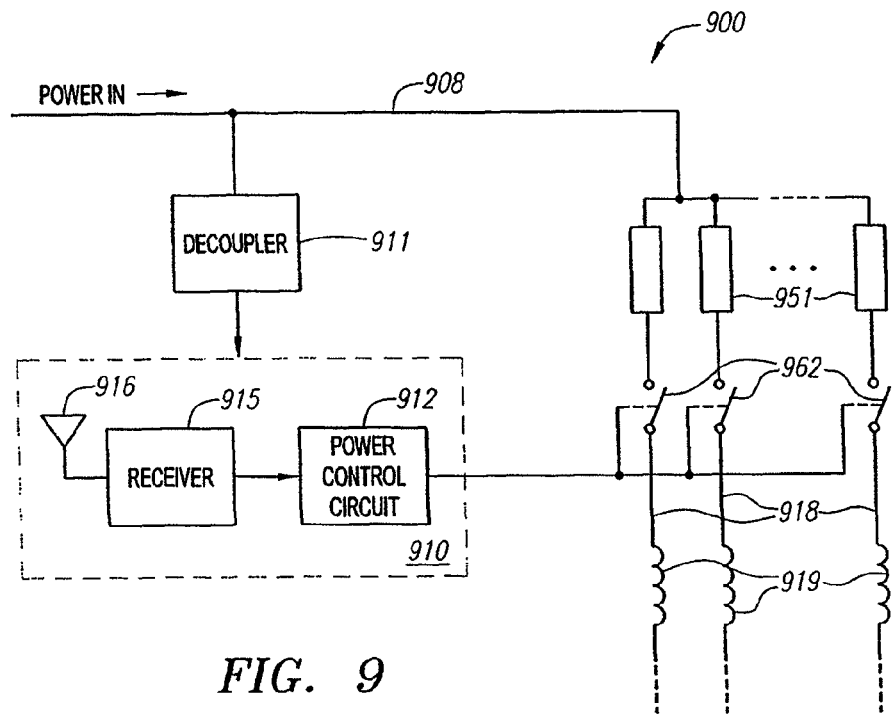
FIG. 9 is a block diagram of another embodiment of a local energy control system as may be used, for example, in various power management systems as disclosed herein.

FIG. 9 is a block diagram of an embodiment of a local energy control system 900 illustrating principles that may be employed, for example, in connection with various power management systems as disclosed herein, and illustrating, among other things, a mechanism for providing power to the local energy control system 900. As shown in FIG. 9, the local energy control system 900 comprises an energy controller 910 by which various controllable switches 962 may be used to selectively disconnect power from incoming power line(s) 908 to various local loads, graphically represented in FIG. 9 as inductive elements 919. As previously described herein with respect to FIGS. 2 and 3, for example, the controllable switches 962 may be connected in series with (e.g., interposed between) circuit breakers 951 (or other similar electrical devices) and the various local loads. A decoupler 911 is preferably used to allow power to be supplied from the incoming power line(s) 908 to the energy controller 910. In a preferred embodiment, the decoupler 911 comprises a capacitor (possibly in combination with other circuit elements), although in alternative embodiments the decoupler 911 may comprise a transformer and, if appropriate, supporting circuit elements.

In alternative embodiments, power may be supplied to the energy controller 910 indirectly, such as from an output of one of the circuit breakers 951 (preferably one that does not have a controllable switch 962 and therefore cannot be disconnected).

The nature of the power signal on the incoming power line(s) 908 (or more generally, power lines 108 in FIG. 1) depends in part on the type of user. Large industrial consumers (e.g., railroads) might accept power directly at voltage levels of 23 to 138 kV, and typically step down the voltages further. Smaller industrial or commercial consumers typically accept power at voltage levels of 4.16 to 34.5 kV. Residential consumers or light commercial users normally receive power from local distribution transformers at nominal voltage levels of 120 and/or 240 Volts. Power received by residential consumers or light commercial users is typically single-phase, alternating current (AC) in nature, with a nominal frequency of about 60 Hertz. The illustrative values described above are typical in the United States, but may vary in other parts of the world.

Certain preferred controllable electronic switches as may be used at local sites in connection with various power management systems as disclosed herein, and in particular various local energy control units, will now be described. First, however, is presented a comparison of preferred controllable electronic switches with conventional electrical components and, in particular, bi-metal based circuit breakers.

FIG. 4 is a conceptual diagram of a bimetal-based circuit breaker 400 as known in the art. As illustrated in FIG. 4, the circuit breaker 400 comprises a bimetal arm 401 which is formed of two metallic layers 402, 403. The bimetal arm 401 is anchored at one end 406, and connects at that end 406 to an incoming power signal line 415. At its other end 407, the bimetal arm 401 resides in electrical contact with an electrical conductor 420. The electrical conductor 420 may be connected to a load (not shown) and, in normal operation (i.e., normal current flow), power from the power signal line 415 is conducted through the bimetal arm 401 and the electrical conductor 420 to the load.

The metallic substances of the different metallic layers 402, 403 of the bimetal arm 401 are selected to have different thermal properties such that they heat at different rates. In particular, the metallic substance of the lower metallic layer 402 heats faster than the metallic substance of the upper metallic layer 403. When the amount of current traveling through the bimetal arm 401 is within "normal" limits, the amount of heating caused by the current passing through the bimetal arm 401 (which has a natural resistivity) is small and the bimetal arm 401 does not deform. However, when the amount of current traveling through the bimetal arm 401 exceeds an over-current limit (which is determined largely by the relative thermal properties of the metallic substances used in the metallic layers 402 and 403), the lower metallic layer 402 heats more rapidly than the upper metallic layer 403 and causes the bimetal arm 401 to bend, thus breaking the electrical circuit path between the incoming power signal line 415 and the electrical conductor 420.

Figures 1, 5:
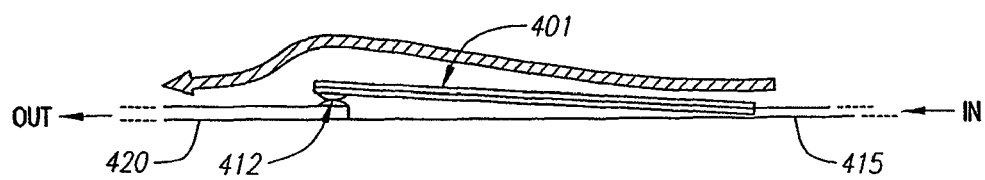
Figures 2, 5:
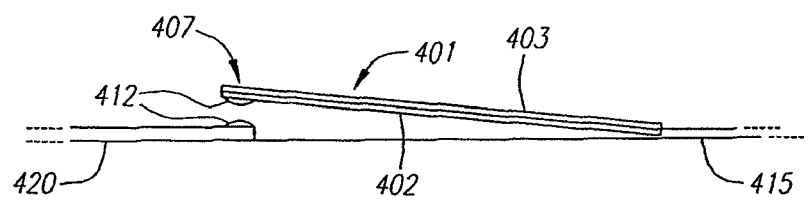

This operation can be illustrated by the diagrams of FIGS. 5-1 and 5-2. FIG. 5-1 is a diagram illustrating an example of the flow of electricity when the circuit breaker 400 of FIG. 4 is closed (normal operation), and FIG. 5-2 is a diagram illustrating an example of how the bimetal arm 401 of the circuit breaker 400 breaks the circuit connection when an over-current situation occurs. As shown in FIG. 5-1, a power signal travels through incoming power wire 415 (marked "IN") through the bimetal arm 401 and across contacts 412, to the electrical conductor 420 (marked "OUT"). So long as the amount of current in the power signal is below the over-current limit, the amount of heating caused by the current passing through the bimetal arm 401 is small, and the bimetal arm 401 does not deform. However, as now shown in FIG. 5-2, when the amount of current traveling through the bimetal arm 401 exceeds the over-current limit, the current heats the bimetal arm 401, but the lower metallic layer 402 heats more rapidly than the upper metallic layer 403 thus causing the bimetal arm 401 to bend. As a result, the contacts 412 gradually separate, breaking the electrical circuit path between the incoming power signal line 415 and the electrical conductor 420. The amount of current needed to cause the circuit breaker 400 to "trip" depends upon the relative thermal properties of the two metallic layers 402, 403 of the bimetal arm 401.

After being tripped, gradually the bimetal arm 401 of the circuit breaker 400 will cool, until eventually the bimetal arm 401 is no longer deformed. As this occurs, the contacts 412 once again form an electrical connection, allowing the power signal to pass from the incoming power wire 415 to the electrical conductor 420.

Figure 6:
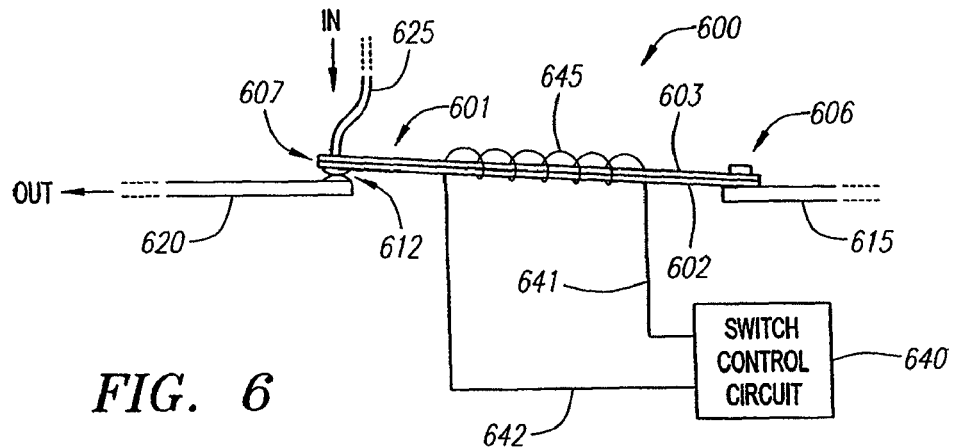
FIG. 6 is a diagram of a controllable electronic switch as may be used in various embodiments of power management systems as disclosed herein.

FIG. 6 is a diagram of a controllable electronic switch 600 as may be used, for example, in certain embodiments of power distribution and management systems and methods, and local energy control units, as described herein. As shown in FIG. 6, the controllable electronic switch 600 comprises a deformable member 601 which may be formed in the general shape of an arm (similar to that shown in FIG. 4) and may be comprised of two layers 602, 603 having different thermal properties. Preferably, the two layers 602, 603 are metallic in nature, although any durable substance that bends when heated can be used. As further shown in FIG. 6, the deformable member 601 is preferably anchored at one end 606 to a non-conductive surface 615. At its other end, the deformable member 601 preferably resides in contact with an electrical conductor 620 through contacts 612. An incoming power wire 625 is connected to the deformable member 601 preferably near the contact point with the electrical conductor 620, so as to minimize any power dissipation caused by the current running through the deformable member 601, and also so as to avoid heating the deformable member 601 to any significant degree regardless of the current being drawn. The electrical conductor 620 may be connected to a load (not shown) and, in normal operation (that is, in the absence of assertion of a switch control signal, as explained below), power from the power signal line 625 is conducted through the deformable member 601 and the electrical conductor 620 to the load.

The metallic substances of the different metallic layers 602, 603 of the deformable member 601 are preferably selected to have different thermal properties such that they heat at different rates. In particular, the metallic substance of the lower metallic layer 602 preferably heats faster than the metallic substance of the upper metallic layer 603. When heat is applied to the deformable member 601, the faster heating of the lower metallic layer 602 as compared to the upper metallic layer 603 causes the deformable member 601 to bend, similar to a circuit breaker 400, thus breaking the electrical circuit path between the incoming power signal line 625 and the electrical conductor 620.

Figures 1, 7:
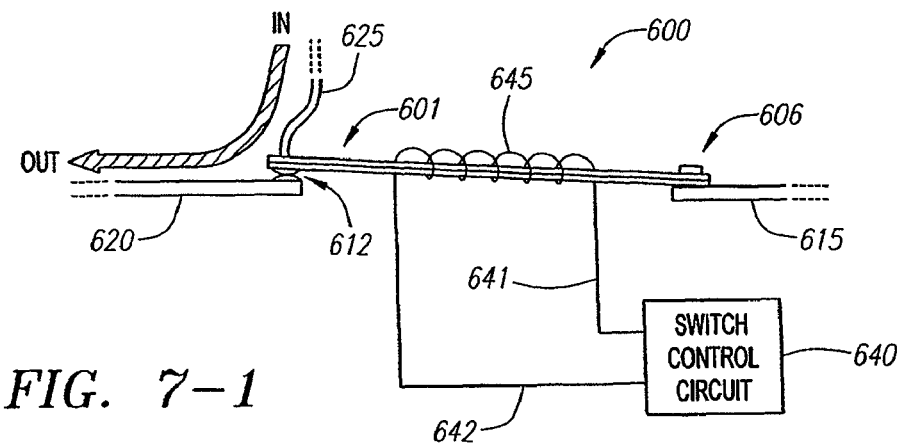
Figures 2, 7:
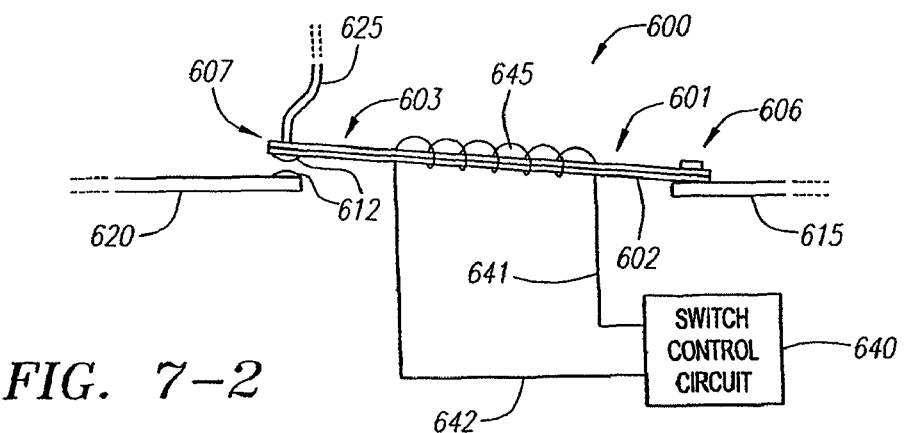

As further illustrated now in FIG. 6, a heating element 645 (such as a resistive coil) is coupled (e.g., wrapped around, in the case of a resistive coil) to the deformable member 601. The heating element 645 is preferably controlled by a switch control circuit 640 connected thereto by a pair of signal lines 641, 642. When the switch control signal output from the switch control circuit 640 is not asserted, the heating element 645 is effectively disconnected (and thus inactive), and power is delivered through the incoming power wire 625 across the end 607 of the deformable member 601, via contacts 612, to the electrical conductor 620, from which it can be further distributed to the load. This operation is illustrated in FIG. 7-1. When, however, the switch control signal from the switch control circuit 640 is asserted, the heating element 645 heats up due to the effect of the current flowing through the heating element 645. Since the lower metallic layer 602 heats more rapidly than the upper metallic layer 603, the deformable member 601 starts to bend bends. Eventually, as a result of this bending, the contacts 612 gradually separate, breaking the electrical circuit path between the incoming power signal line 625 and the electrical conductor 620, as illustrated in FIG. 7-2.

So long as the switch control signal from the switch control circuit 640 is asserted, the heating element 645 continues to keep the deformable member 601 bent and the electrical path between the incoming power wire 625 and the electrical conductor 620 disconnected. Once the switch control signal from the switch control circuit 640 is de-asserted, the deformable member 601 gradually cools, until eventually the deformable member 601 is no longer deformed. As this occurs, the contacts 612 once again form an electrical connection, allowing the power signal to pass from the incoming power wire 625 to the electrical conductor 620 and then to the load.

In one aspect, the controllable electronic switch 600 illustrated in FIG. 6 can provide a convenient, inexpensive mechanism for controlling the distribution of power from a source to a load. Moreover, the controllable electronic switch 600 need not consume any power when the deformable member 601 is in a closed position, and only requires minimal power to cause the deformable member 601 to open.

The incoming power wire 625 may be connected to the deformable member 601 in any of a variety of manners. The incoming power wire 625 may, for example, simply be welded, spliced or soldered to the moving end 607 of the deformable member 601. Any form of attaching the incoming power wire 625 to the deformable member 601 will suffice so long as electricity conducts between the incoming power wire 625 and the electrical conductor 620 when the deformable member 601 is in a switch-closed position.

Figure 8:
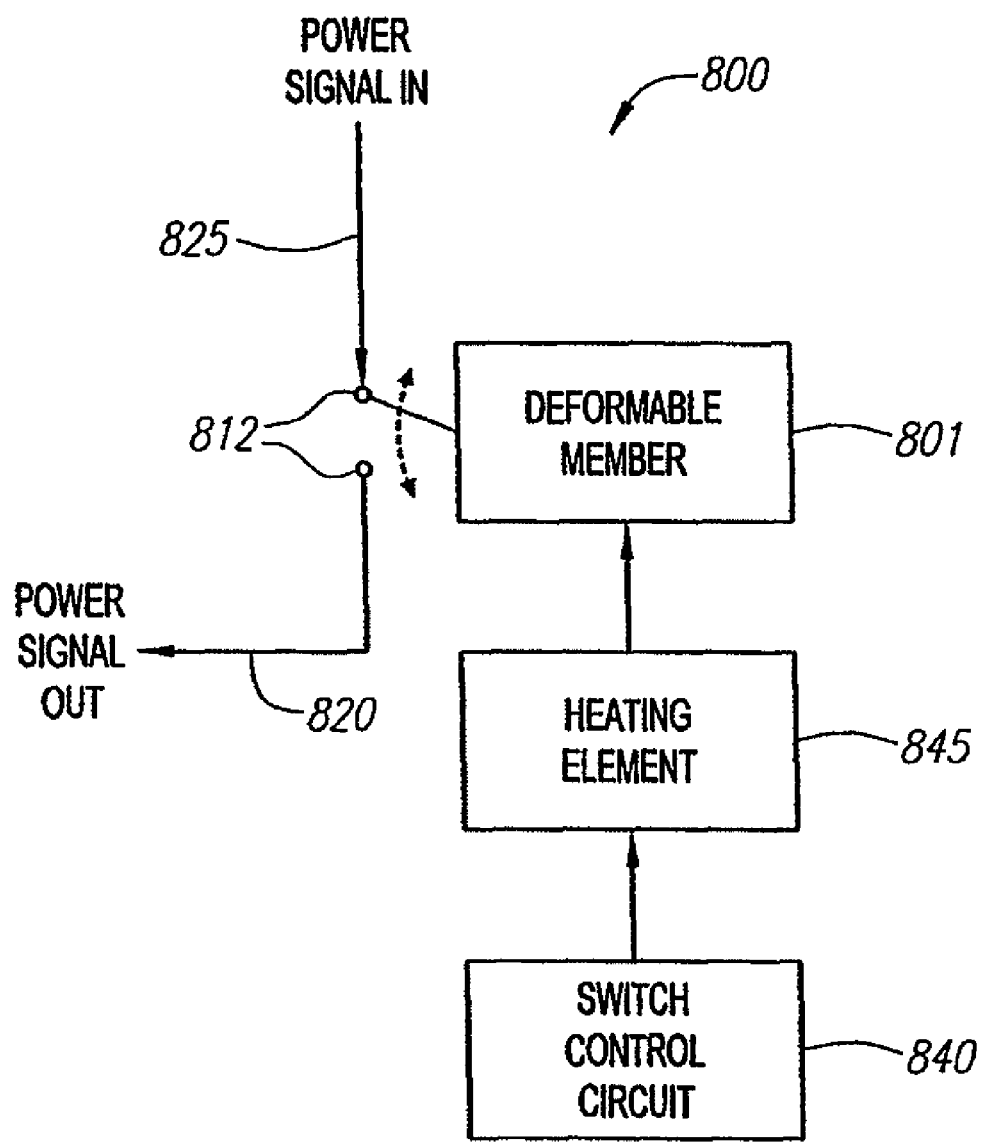
FIG. 8 is a block diagram illustrating another embodiment of a controllable electronic switch as may be used in various embodiments of power management systems as disclosed herein.

FIG. 8 is a block diagram illustrating a more general embodiment of a controllable electronic switch 800. As illustrated in FIG. 8, the controllable electronic switch 800 comprises a deformable member 801 which controllably connects an incoming power wire 825 to an electrical conductor 820. A heating element 845 is coupled to the deformable member 801, and is controlled by a switch control circuit 840. The deformable member 801, which may take the form of, e.g., a bimetal member or arm, preferably allows the incoming power wire 825 to conduct a power signal to the electrical conductor 820 when the deformable member 801 is not being heated by the heating element 845, but preferably causes the connection between the incoming power wire 825 to the electrical conductor 820 to be physically broken when then deformable member 801 is heated by the heating element 845. The heating element 845 may comprise, e.g., a resistive coil or other resistor, and, if a resistive coil, may be conveniently wound around the deformable member 801 if embodied as a bimetal member or arm.

In either of the embodiments illustrated in FIGS. 6 and 8, the deformable member 601 or 801 need not be uniformly straight and, in fact, can be any shape so long as, when heated, it bends in a predictable manner so as to break the electrical connection between the incoming power wire 625 or 825 and the electrical conductor 620 or 820. Moreover, although the deformable member 601 or 801 is described in a preferred embodiment as a bimetal arm having two metallic layers, it alternatively could be made out of any other material (metallic or otherwise) that bends in a predictable manner. Because no current needs to travel from one end of the deformable member 601 or 801 to the other end (unlike a circuit breaker), the deformable member 601 or 801 may, if desired, have non-conductive or insulating portions separating the various areas of the deformable member 601 or 801 from one another. For example, a non-conductive portion (e.g., plastic) could be placed between the area of the deformable member 601 or 801 coupled to the heating element 645 or 845 and either end of the deformable member 601 or 801 (e.g., either end 606 and/or 607 of the deformable member 601 in the example of FIG. 6). Further, the end of the deformable member 601 through which power is conducted (e.g., end 607 in FIG. 6) need not be bimetal, but could be a uniform conductive material (e.g., a single metal). Alternatively, the deformable member 601 or 801 could have additional (i.e., more than two) layers. The primary quality of the deformable member 601 or 801 is that it bends or otherwise deforms sufficiently when heated so as to break the electrical connection of the path of the power signal (e.g., by separating contacts 612 in the example of FIG. 6).

The switch control signal output from the switch control circuit 640 or 840 to the heating element 645 or 845 is preferably a direct current (DC) signal, but could also be an alternating current (AC) signal or hybrid signal. When the switch control signal is not asserted, the switch control circuit 640 may simply short the heating element 645 or 845 (e.g., by shorting wires 641, 642 in the example of FIG. 6), or else simply isolate the heating element 645 or 845 through a buffer or other isolation circuit.

While the heating elements 645 and 845 in FIGS. 6 and 8 have been described in preferred embodiments as a resistive coil, the heating element 645 or 845 could take other forms or configurations. For example, if embodied as a resistive coil, the heating element 645 or 845 need not be wound around the deformable member 601 or 801. The heating element 645 or 845 could be a different type of resistor besides a resistive coil. However, a resistive coil is preferred as the heating element 645 or 845 because it provides relatively even heating over a given area, and is relatively simple to implement and is relatively inexpensive.

The speed of response of the deformable member 601 or 801 to the switch control circuit 640 or 840 may or may not be critical, depending upon the particular application. If the speed of response is not very critical, then the switch control signal can be a very low power signal. If faster response time is desired, the switch control signal can be increased in power, thus causing more rapid heating of the heating element 645 or 845. The switch control circuit 640 or 840 may be provided with its own power source (e.g., a battery), or else it may obtain power from the incoming power wire 625 or 825 or some other available source. The switch control circuit 640 or 840 may be activated by a manual switch (not shown) which causes assertion of the switch control signal and, therefore, eventual opening of the controllable electronic switch 600 or 800, or else may be activated by a remote electronic signal.

Figure 14:
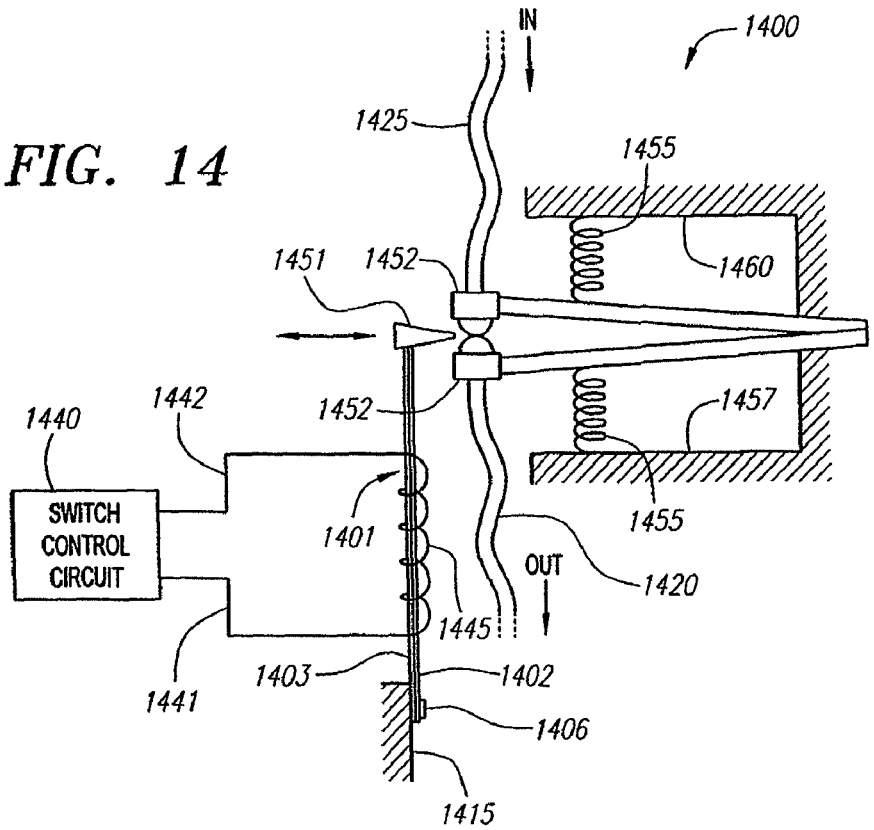
FIG. 14 is a diagram of another embodiment of a controllable electronic switch using a wedge to break electrical contacts in a circuit path.

FIG. 14 is a diagram of another embodiment of a controllable electronic switch 1400 using a wedge to physically break electrical contacts in a circuit path. As illustrated in FIG. 14, the controllable electronic switch 1400 comprises a generally elongate deformable member 1401 which is formed of two layers 1402, 1403, similar in nature to the deformable member 601 described previously with respect to FIG. 6. In a preferred embodiment, the deformable member 1401 comprises a bimetal arm, and the two layers 1402, 1403 are metallic in nature, although more generally the two layers 1402, 1403 may be comprised of any suitable materials having sufficiently different thermal properties to carry out the functions described herein. The deformable member 1401 is preferably anchored at one end 1406 to a non-conductive surface 1405. At its other end, the deformable member 1401 has a wedge-shaped member 1451.

As further illustrated in FIG. 14, narrow end of the wedge-shaped member 1451 resides in close proximity to a pair of electrical contacts 1452. The pair of electrical contacts 1452 reside in contact with a pair of electrical conductors 1420, 1425, the first electrical conductor 1425 serving as an incoming power wire and the second electrical conductor 1420 serving as a power delivery means to a load (not shown). In normal operation, power from the first electrical conductor 1425 is conducted through the electrical contacts 1452 to the second electrical conductor 1420 and thereby to the load. The electrical contacts 1452 are attached to a pair of non-conductive arms 1457, which are anchored to a stable surface 1460. A pair of springs 1455 or other such means applies force to the non-conductive arms 1457 and thereby maintains the electrical contacts 1452 in contact in normal operation.

Figure 15:
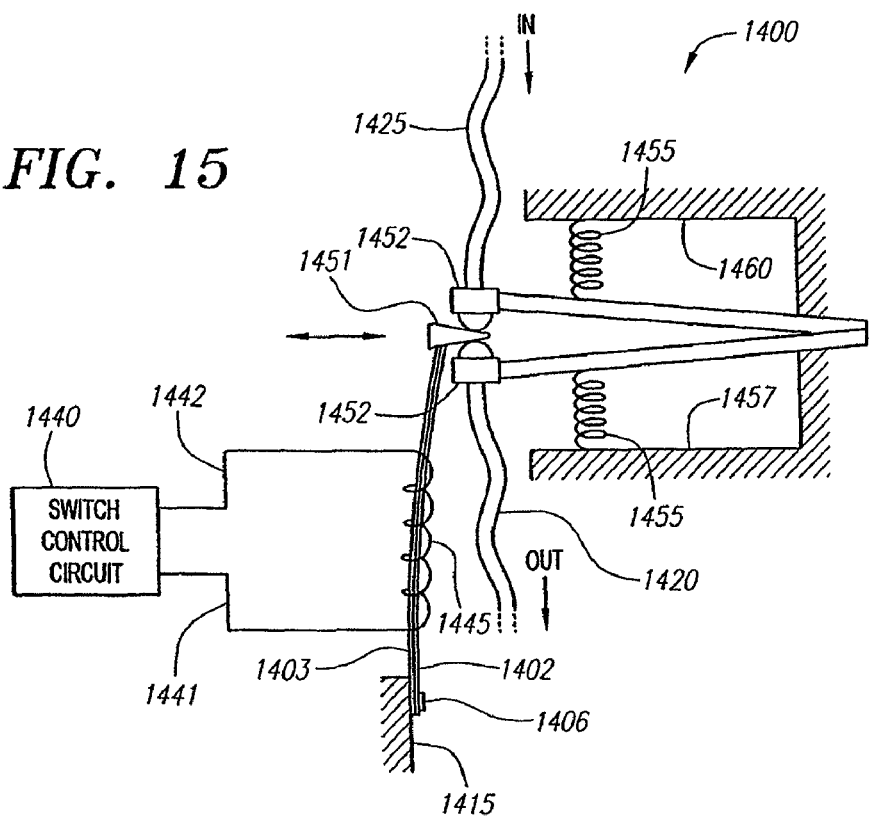
FIG. 15 is a diagram showing an example of how the controllable electronic switch shown in FIG. 14 breaks an electrical connection.

The electrical path formed across the electrical contacts 1452 may be broken by application of a control signal to the deformable member 1401. To this end, a heating element 1445 (such as a resistive coil) is coupled to the deformable member 1401 (e.g., wrapped around the deformable member 1401, where embodied as a resistive coil). The heating element 1445 is preferably controlled by a switch control circuit 1440 connected thereto by a pair of signal lines 1441, 1442. When the switch control signal output from the switch control circuit 1440 is not asserted, the heating element 1445 is effectively disconnected (and thus inactive), and power is delivered through the incoming power wire 1425 across the electrical contacts 1452 to the electrical conductor 1420, from which it can be further distributed to the load. When, however, the switch control signal from the switch control circuit 1440 is asserted, the heating element 1445 heats up due to the effect of the current flowing through the heating element 1445. Similar to the deformable member 601 previously described with respect to FIG. 6, the deformable member 1401 of controllable electronic switch 1400 starts to bend. Eventually, as a result of this bending, the wedge 1451 if forced between the electrical contacts 1452, causing the contacts 1452 to gradually separate (with springs 1455 gradually compressing), and breaking the electrical circuit path between the incoming power signal line 1425 and the electrical conductor 1420, as illustrated in FIG. 15.

So long as the switch control signal from the switch control circuit 1440 is asserted, the heating element 1445 continues to keep the deformable member 1401 bent and the electrical path between the incoming power wire 1425 and the electrical conductor 1420 disconnected. Once the switch control signal from the switch control circuit 1440 is de-asserted, the deformable member 1401 gradually cools, until eventually the deformable member 1401 is no longer deformed. As this occurs, the wedge 1451 gradually retracts, causing the electrical contacts 1452 to come together and once again form an electrical connection, which in turn allows the power signal to pass from the incoming power wire 1425 to the electrical conductor 1420 and then to the load.

In one aspect, the controllable electronic switch 1400 illustrated in FIG. 14, like the controllable electronic switch 600 of FIG. 6, can provide a convenient, inexpensive mechanism for controlling the distribution of power from a source to a load. Moreover, the controllable electronic switch 1400 need not consume any power when the electrical contacts 1452 are in a closed position, and only requires minimal power to cause the deformable member 1401 to bend and the electrical contacts 1452 to spread apart, opening the power signal circuit path.

FIG. 16 is a diagram of another embodiment of a controllable electronic switch 1600 using a wedge-shaped member to break electrical contacts in a circuit path. Many of the components shown in FIG. 16 are similar in nature to those illustrated in FIG. 14. Thus, for example, the controllable electronic switch 1600 of FIG. 16 comprises a generally elongate deformable member 1601 which is formed of two layers 1602, 1603, similar in nature to the deformable member(s) 601, 1401 described previously with respect to FIGS. 6 and 14, respectively. In a preferred embodiment, the deformable member 1601 comprises a bimetal arm, and the two layers 1602, 1603 are metallic in nature, although more generally the two layers 1602, 1603 may be comprised of any suitable materials having sufficiently different thermal properties to carry out the functions described herein. The deformable member 1601 is preferably anchored at one end 1606 to a non-conductive surface 1605. At its other end, the deformable member 1601 has a wedge-shaped member 1651 that, as will be described in more detail below, functions as a mechanical cam.

As further illustrated in FIG. 16, one end of the wedge-shaped member 1651 resides in close proximity to a pair of electrical contacts 1652. The pair of electrical contacts 1652 reside in contact with a pair of electrical conductors 1620, 1625, the first electrical conductor 1625 serving as an incoming power wire and the second electrical conductor 1620 serving as a power delivery means to a load (not shown). In normal operation, power from the first electrical conductor 1625 is conducted through the electrical contacts 1652 to the second electrical conductor 1620 and thereby to the load. The electrical contacts 1652 are attached to a pair of non-conductive arms 1657, which are anchored to a stable surface 1660. A pair of springs 1655 or other such means applies force to the non-conductive arms 1657 and thereby maintains the electrical contacts 1652 in contact in normal operation.

Similar to the FIG. 14 embodiment, the electrical path formed across the electrical contacts 1652 may be broken by application of a control signal to the deformable member 1601. To this end, a heating element 1645 (such as a resistive coil) is coupled to the deformable member 1601 (e.g., wrapped around the deformable member 1601, where embodied as a resistive coil). The heating element 1645 is preferably controlled by a switch control circuit 1640 connected thereto by a pair of signal lines 1641, 1642. When the switch control signal output from the switch control circuit 1640 is not asserted, the heating element 1645 is effectively disconnected (and thus inactive), and power is delivered through the incoming power wire 1625 across the electrical contacts 1652 to the electrical conductor 1620, from which it can be further distributed to the load. When, however, the switch control signal from the switch control circuit 1640 is asserted, the heating element 1645 heats up due to the effect of the current flowing through the heating element 1645, and as a result the deformable member 1601 starts to bend. Eventually, as a result of this bending, the wedge 1651 if forced between the electrical contacts 1652, causing the contacts 1652 to gradually separate (with springs 1655 gradually compressing), and breaking the electrical circuit path between the incoming power signal line 1625 and the electrical conductor 1620, similar to the illustration in FIG. 15.

Unlike the embodiment of FIG. 14, the wedge-shaped member 1651 of the controllable electronic switch 1600 of FIG. 16 acts as a mechanical cam with multiple latching positions, thus alleviating the need to maintain the control signal to keep the circuit open. When the wedge-shaped member 1651 is latched in a first position, it is removed from the electrical contacts 1652, which remain closed, and the power signal circuit path is uninterrupted. On the other hand, when the wedge-shaped member 1651 is latched in a second position, it forces the electrical contacts 1652 apart, thus interrupting the power signal circuit path. In either latched position, no power is required to keep the controllable electronic switch 1600 in its current state (open or closed). Latching of the wedge-shaped member 1651 in the various positions is accomplished, in this example, by way of a latching member 1680 comprising, e.g., an arm 1682 terminated in a ball 1681 that rests against the wedge-shaped member 1651. In the instant example, the arm 1682 of the latching member 1680 is anchored to surface 1660, but the latching member 1680 may be anchored to any other available surface instead. Thus, in this example, the latching member 1680 is adjacent to the arms 1657 supporting the electrical contacts 1652.

FIGS. 17-1, 17-2 and 17-3 are diagrams of different views illustrating an example of the wedge-shaped member 1651 of the controllable electronic switch 1600 of FIG. 16, and in particular FIGS. 17-2 and 17-3 illustrate the wedge-shaped member 1651 of FIG. 17-1 latched in the first position. The wedge-shaped member 1651 in this example comprises a front wedge section 1705 (which may be generally broad-surfaced and sloping), a central socket 1701, and a rear wedge section 1706 (which may be tapered and sloping) defining a shallow rear socket 1708. As best illustrated in FIGS. 17-2 and 17-3, the ball 1681 of the latching member 1680 rests on the front wedge section 1705 when the wedge-shaped member 1651 is latched in the first position (the arm 1682 is omitted from FIGS. 17-2 and 17-3 for clarifying the other features shown). The ball 1681 may effectively hold the wedge-shaped member 1651 in place when latched in the first position, although in certain embodiments the ball 1681 may not need to contact the wedge-shaped member 1651 and would generally lie in proximity therewith.

Figures 7, 18:
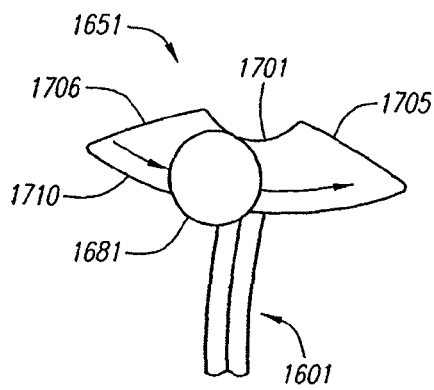
Figures 8, 18:
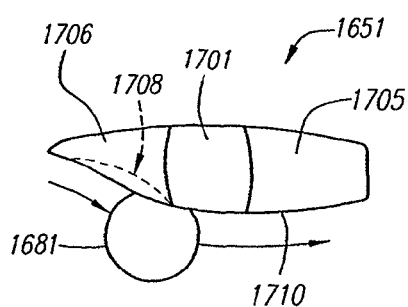

FIGS. 18-1 through 18-8 are diagrams illustrating how the wedge-shaped member 1651 transitions between different latching positions. FIGS. 18-1 and 18-2 are similar to FIGS. 17-2 and 17-3, respectively, and show the wedge-shaped member 1651 at rest in the first latched position. FIG. 18-3 illustrates what happens as the deformable member 1601 is heated in response to the control signal being applied to the heating element 1645 (shown in FIG. 16). In this situation, the deformable member 1601 starts to bend, forcing the wedge-shaped member 1651 forward. When that occurs, the ball 1681 slides over the sloping surface of the front wedge section 1705, and comes to rest in the central socket 1701 of the wedge-shaped member 1651, causing the wedge-shaped member to stabilize in the second latched position. For comparative purposes, the first latched position is represented by a dotted outline 1651' of the wedge-shaped member, although the actual dimensions of movement may be somewhat exaggerated for illustration purposes. In practice, movement of the wedge-shaped member 1651 by only a few hundredths of an inch may be sufficient to change latched positions. Even after the control signal is de-asserted, the ball 1681 retains the wedge-shaped member 1651 in the second latched position, by virtue of its resting firmly in the central socket 1701. The wedge-shaped member 1651 thereby keeps the contacts 1652 separated while it is held in the second latching position.

Application of a subsequent control signal causes the wedge-shaped member 1651 to return to the first latched position. When the subsequent control signal is applied, the deformable member 1601 again heats up, causing it to bend and the wedge-shaped member 1651 to gravitate forwards. The ball 1681 is thereby forced out of the central socket 1701 and onto the second wedge section 1706, as illustrated in FIG. 18-5. The ball 1681 slides down the tapered surface of the second wedge section 1706, and due to the very narrow tail end of the second wedge section 1706 (which is preferably asymmetrically tapered) the ball 1681 slides off the more sharply tapered side of the second sedge section 1706 and is captured by the upper lip of the shallow rear socket 1708, as illustrated in FIG. 18-6. The upper lip of the shallow rear socket 1708 helps guide the ball 1681 along the outer side surface 1710 of the wedge-shaped member 1651, as illustrated from a side view in FIG. 18-7 and a top view in FIG. 18-8, during which time the arm 1682 of the latching member 1680 may be forced slightly to the side of the wedge-shaped member 1651 (or vice versa). As the deformable member 1601 cools, the ball 1681 slides along the outer side surface 1710 of the wedge-shaped member 1651 and eventually reaches the narrow tip region of the front wedge section 1705, whereupon the arm 1682 of the latching member 1680 straightens out and forces the ball 1681 onto the surface of the front wedge section 1705, returning the wedge-shaped member 1651 to the first latched position as illustrated in FIGS. 18-1 and 18-2.

The above process may be repeated as desired to allow the controllable electronic switch 1680 to open and close the electrical contacts 1652 by having the wedge-shaped member 1651 move between the first and second latched positions.

The control signal that is applied to cause the wedge-shaped member 1651 to move may take the form of, e.g., an impulse signal.

Figure 19:
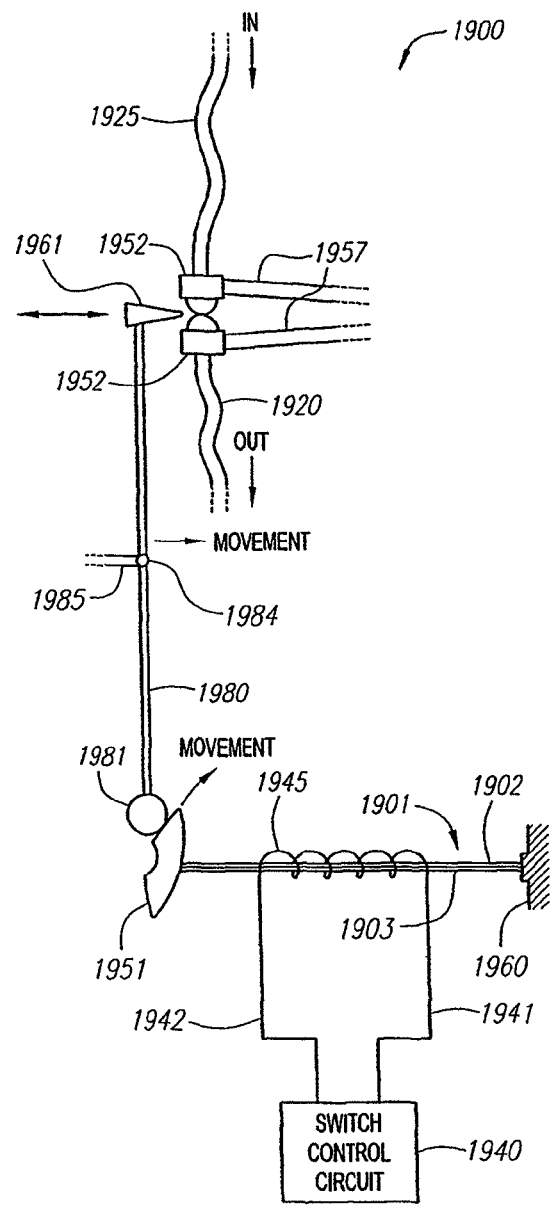
FIG. 19 is a diagram of yet another embodiment of a controllable electronic switch using a wedge to break electrical contacts in a circuit path, having a mechanical cam with multiple latching positions.

FIG. 19 is a diagram of yet another embodiment of a controllable electronic switch 1900 using a wedge-shaped member to break electrical contacts in a circuit path, again employing principles of a mechanical cam with multiple latching positions. In FIG. 19, the controllable electronic switch 1900 comprises a generally elongate deformable member 1901 which, as before, is formed of two layers 1902, 1903, similar in nature to, e.g., the deformable member(s) 601, 1401 described previously with respect to FIGS. 6 and 14, respectively. In a preferred embodiment, the deformable member 1901 comprises a bimetal arm, and the two layers 1902, 1903 are metallic in nature, although more generally the two layers 1902, 1903 may be comprised of any suitable materials having sufficiently different thermal properties to carry out the functions described herein. The deformable member 1901 is preferably anchored at one end 1906 to a non-conductive surface 1905. At its other end, the deformable member 1901 has a wedge-shaped member 1951 that, as will be described in more detail below, functions as a mechanical cam.

As further illustrated in FIG. 19, a pivoting arm 1980 is positioned between the first wedge-shaped member 1951 and a pair of electrical contacts 1952. The pair of electrical contacts 1952 reside in contact with a pair of electrical conductors 1920, 1925, the first electrical conductor 1925 serving as an incoming power wire and the second electrical conductor 1920 serving as a power delivery means to a load (not shown). In normal operation, power from the first electrical conductor 1925 is conducted through the electrical contacts 1952 to the second electrical conductor 1920 and thereby to the load. The electrical contacts 1952 are attached to a pair of non-conductive arms 1957, which are anchored to a stable surface (not shown). A pair of springs (not shown, but similar to springs 1655 in FIG. 16) or other such means applies force to the non-conductive arms 1957 and thereby maintains the electrical contacts 1952 in contact in normal operation.

As further illustrated in FIG. 19, the pivoting arm 1980 has a ball 1981 at one end and a second wedge-shaped member 1961 at the opposite end. The pivoting arm 1980 may be secured to a fixed structure 1985 at, e.g., a generally centrally located pivoting point 1984.

Figure 20:
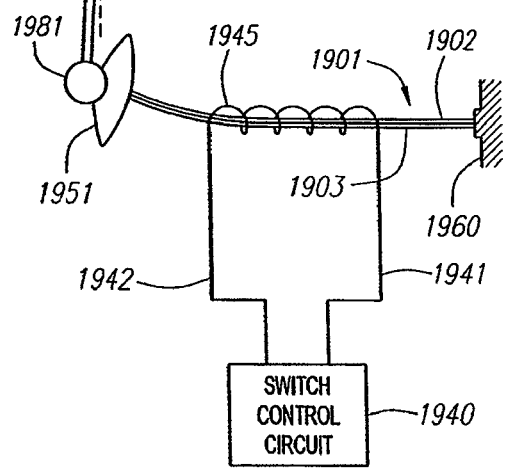
FIG. 20 is a diagram showing an example of how the controllable electronic switch shown in FIG. 19 breaks an electrical connection.

The electrical path formed across the electrical contacts 1952 may be broken by application of a control signal to the deformable member 1901. To this end, a heating element 1945 (such as a resistive coil) is coupled to the deformable member 1901. The heating element 1945 is preferably controlled by a switch control circuit 1940 connected thereto by a pair of signal lines 1941, 1942. When the switch control signal output from the switch control circuit 1940 is not asserted, the heating element 1945 is effectively disconnected (and thus inactive), and power is delivered through the incoming power wire 1925 across the electrical contacts 1952 to the electrical conductor 1920, from which it can be further distributed to the load. When, however, the switch control signal from the switch control circuit 1940 is asserted, the heating element 1945 heats up due to the effect of the current flowing through the heating element 1945, and as a result the deformable member 1901 starts to bend. Eventually, as a result of this bending, the wedge-shaped member 1951 presses the ball 1981 of pivoting arm 1980 such that it becomes displaced as the pivoting arm 1680 is forced to rotate slightly in the clockwise direction. This motion forces the other end of the pivoting arm 1980 to move in a clockwise direction, which in turn forces the second wedge-shaped member 1961 between the electrical contacts 1952. This action causes the contacts 1952 to gradually separate, and breaks the electrical circuit path between the incoming power signal line 1925 and the electrical conductor 1920, as illustrated in FIG. 20.

Similar the embodiment of FIG. 16, the wedge-shaped member 1951 of the controllable electronic switch 1900 of FIG. 19 acts as a mechanical cam with multiple latching positions, thus alleviating the need to maintain the control signal to keep the circuit open. When the first wedge-shaped member 1951 is latched in a first position, it causes the second wedge-shaped member 1961 to be removed from the electrical contacts 1952, which remain closed, and the power signal circuit path is uninterrupted. On the other hand, when the first wedge-shaped member 1951 is latched in a second position, it causes the second wedge-shaped member 1961 to force the electrical contacts 1952 apart, thus interrupting the power signal circuit path. In either latched position, no power is required to keep the controllable electronic switch 1900 in its current state (open or closed). Latching of the wedge-shaped member 1951 in the various positions is accomplished, in this example, by the pivoting arm 1980 which, similar to latching member 1680, is terminated in a ball 1981 that rests against the wedge-shaped member 1951.

Motion of the ball 1981 with respect to the first wedge-shaped member 1951 is similar to the described with respect to the controllable electronic switch 1600 of FIG. 16 and the illustrations in FIGS. 17-1 through 17-3 and 18-1 through 18-8. However, rather than the first wedge-shaped member 1951 itself being inserted between the contracts 1952 to open them, the first wedge-shaped member 1951 causes the pivoting arm 1980 to swing back and forth, thereby causing the second wedge-shaped member 1961 to move forwards and backwards and to open and close the electrical contacts 1952.

Figure 21:
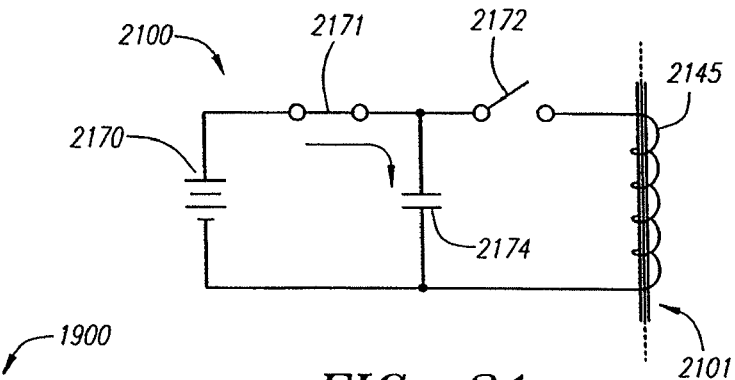
FIGS. 21, 22, and 23 are simplified schematic diagrams illustrating examples of control circuits or portions thereof that may be used with various controllable electronic switches disclosed herein.
Figure 22:
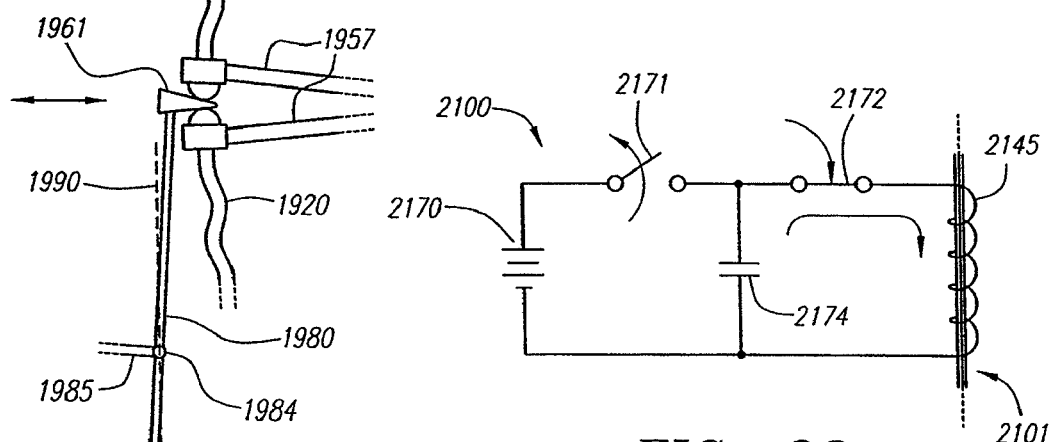
Figure 23:
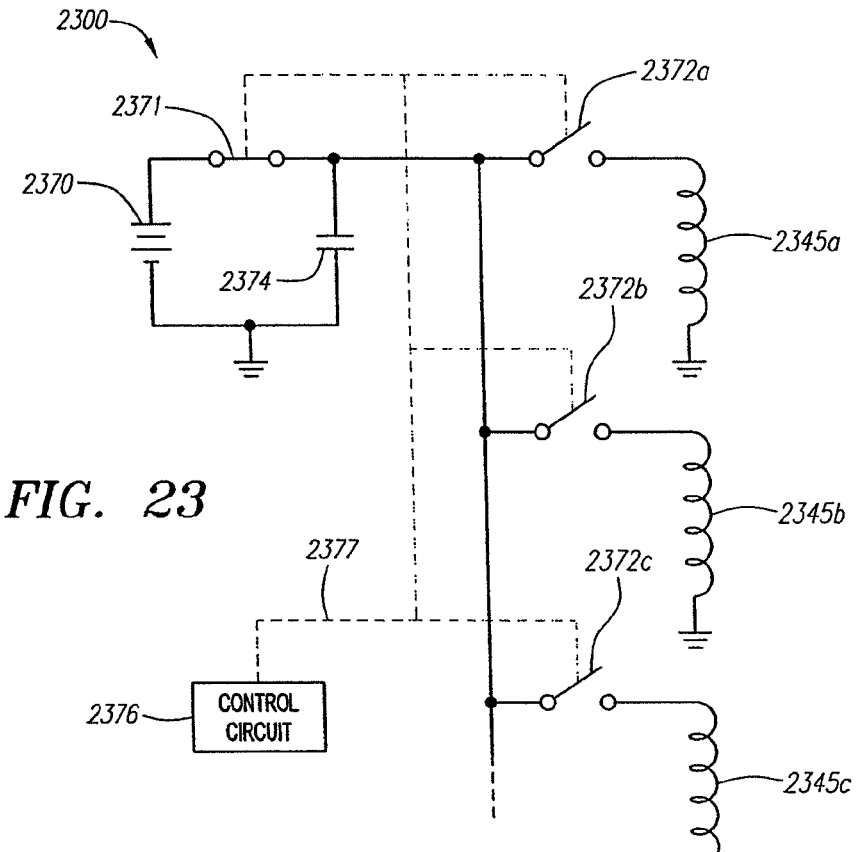

It should be noted that the embodiments illustrated in FIGS. 16 and 19, and elsewhere, are merely examples and are not intended to be exhaustive nor limiting of the concepts and principles disclosed herein. While certain cam mechanisms have been described and illustrated, and cam or other similar mechanism may also be used to perform similar functions. Alternative embodiments may include, for example, any member that is used in connection with separating electrical contacts (or other type of circuit connection), has at least one stable position and one or more unstable positions, and transitions between the stable and unstable positions through application of a control signal. A variety of different mechanical structures can be utilized in place of the wedge-shaped member(s) described herein and illustrated in the drawings FIGS. 21, 22, and 23 are simplified schematic diagrams of examples of control circuits or portions thereof that may be used with various controllable electronic switches disclosed herein. In FIG. 21, a control signal generator 2100 includes a power source 2170 (e.g., battery or other DC source) connected via a first switch 2171 to a capacitor 2174. The capacitor 2174 is connected via a second switch 2172 to a heating element 2145, such as a resistive coil, which is proximate to a deformable member 2101. The heating element 2145 and deformable member 2101 may represent similar components which are illustrated in FIG. 16 or 19 or any of the other controllable electronic switch embodiments described herein.

In operation, the power source 2170 maintains capacitor 2174 in a charged state when switch 2171 is closed and switch 2172 is open. Since switch 2172 is open, the heating element 2145 is disengaged, and the deformable member 2101 remains in its natural unheated state. To apply a control signal to the heating element 2145, a control circuit (not shown) opens switch 2171 and closes 2172, as illustrated in FIG. 22. As a result, power source 2170 is disengaged from capacitor 2174, and the capacitor 2174 discharges into the heating element 2145. The capacitor 2174 may be selected to be of sufficient size and rating to hold the appropriate amount of charge to cause heating element 2145 to heat up sufficiently to cause the deformable member 2101, particularly if embodied as a latching cam mechanism (such as in FIGS. 16 and 19, for example), to be forced into the next latched state. Once the capacitor 2174 has been substantially discharged, switch 2171 may be closed and switch 2172 opened, to recharge the capacitor 2174. The switches 2171, 2172 may then again be toggled to discharge the capacitor 2174 a second time and cause the deformable member 2101, where embodied as a latching cam mechanism, to be forced into another latched state (or returned to its original latched state).

FIG. 23 applies the same principles of FIGS. 21 and 22 to a system of controllable electronic switches. The control circuit system 2300 of FIG. 23 includes a power source 2370 and capacitor 2374 similar to the counterparts of FIGS. 21 and 22. A first switch 2371 is analogous to switch 2171 in FIGS. 21 and 22, and is generally closed when charging the capacitor 2374. When it is desired to activate the controllable electronic switches, a control circuit 2376 opens switch 2371 and closes the switches 2372a, 2372b, 2372c, . . . associated with the controllable electronic switches to be activated. Only selected ones of the switches 2372a, 2372b, 2372c, . . . need be activated, according to the programming of the control circuit 2376. For the switches 2372a, 2372b, 2372c, . . . that are closed, the respective heating elements (e.g., resistive coils) 2345a, 2345b, 2345c, . . . heat up, causing deformation of the proximate deformable members and activation of the controllable electronic switches according to principles previously described herein.

Figure 24:
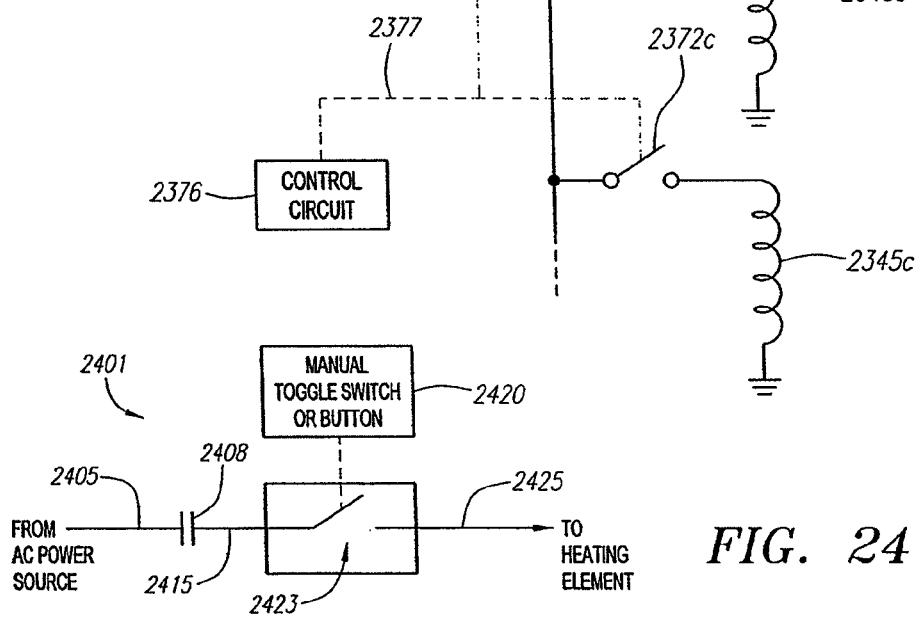
FIG. 24 is a diagram of one embodiment of a switch control circuit as may be used in connection with various controllable electronic circuit embodiments shown or described herein.

FIG. 24 is a diagram of an embodiment of a switch control circuit 2401 as may be used in connection with various controllable electronic switch embodiments shown or described herein—for example, the controllable electronic circuits shown in FIG. 6, 8, or 14, or others. As illustrated in FIG. 24, the switch control circuit 2401 comprises an incoming AC power signal 2405 which is coupled to a capacitor 2408, which in turn is connected to a heating element (not shown) via an electronic or electro-mechanical switch 2423. A manual toggle switch or button 2420 is used to activate the electronic or electro-mechanical switch 2423, which selectively allows the incoming power signal 2405 to pass to the heating element 2425. The incoming AC power signal 2405 may be, e.g., single-phase electrical power drawn from a power line, and the design illustrated in FIG. 24 thereby provides a low cost, high efficiency mechanism (with minimal current drain) for activating the controllable electronic switch.

Figure 25:
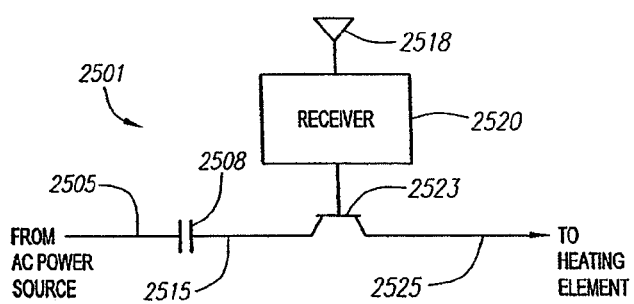
FIG. 25 is a diagram of another embodiment of a switch control circuit as may be used in connection with various controllable electronic circuit embodiments as shown or described herein.

FIG. 25 is a diagram of another embodiment of a switch control circuit 2501 as may be used in connection with various controllable electronic switch embodiments as shown or described herein—for example, the controllable electronic circuits shown in FIG. 6, 8, or 14, or others. As illustrated in FIG. 25, the switch control circuit 2501 comprises an incoming AC power signal 2505 which is coupled to a capacitor 2508, which in turn is connected to a heating element (not shown) via an electronic 2523. A receiver 2520 receives a remote command signal via antenna 2518 and, in response thereto, opens or closes the switch 2523, which selectively allows the incoming power signal 2405 to pass to the heating element 2525. The receiver 2520 may be configured to communicate using any wireless technique, and may, for example, be advantageously configured to receive signals transmitted using either frequency shift keying (FSK) or FM sideband transmission. More complicated commands may be delivered via the receiver 2520, thereby allowing the switch control circuit 2501 to be utilized as part of a circuit control system that controls the states numerous controllable electronic switches and allows more complex processes and decisions to be carried out. The incoming AC power signal 2505 may be, e.g., single-phase electrical power drawn from a power line, and the design illustrated in FIG. 25 thereby provides a relatively low cost, flexible, and high efficiency mechanism (with minimal current drain) for activating the controllable electronic switch.

Figure 26:
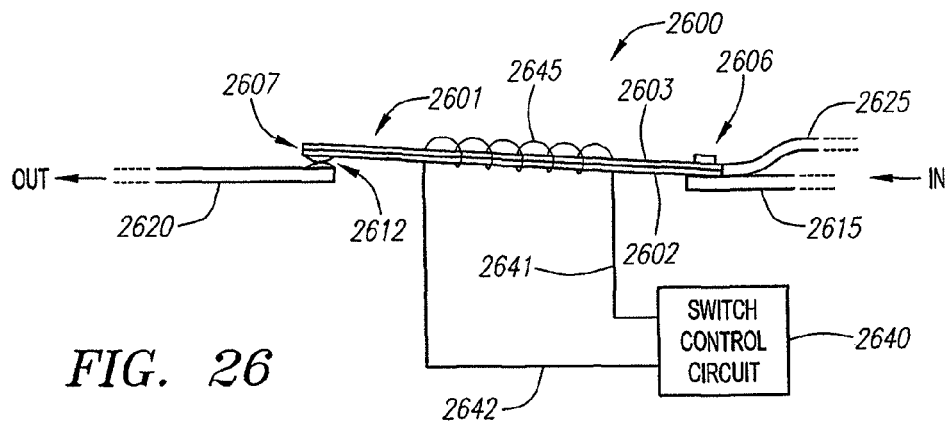
FIG. 26 is a diagram of another embodiment of a controllable electronic switch.
Figure 28:
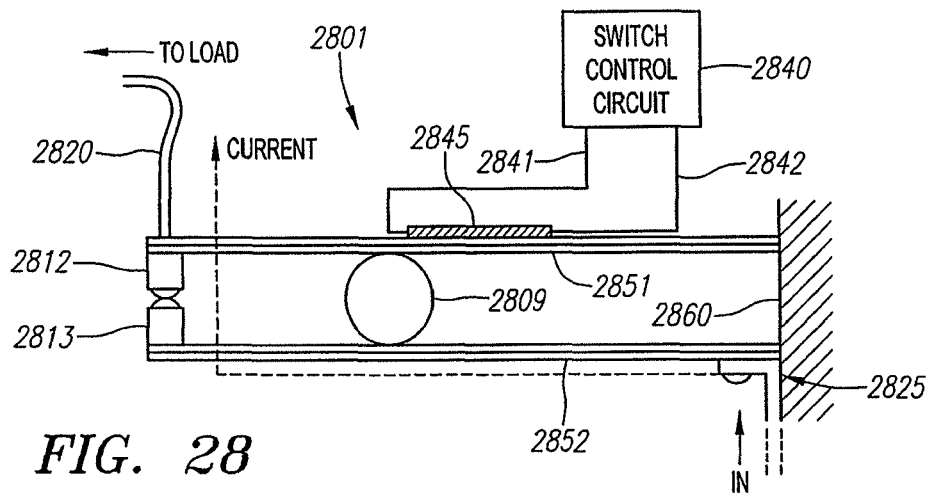
FIG. 28 is a diagram of a controllable electronic switch, utilizing a pair of opposing deformable members.
Figure 30:
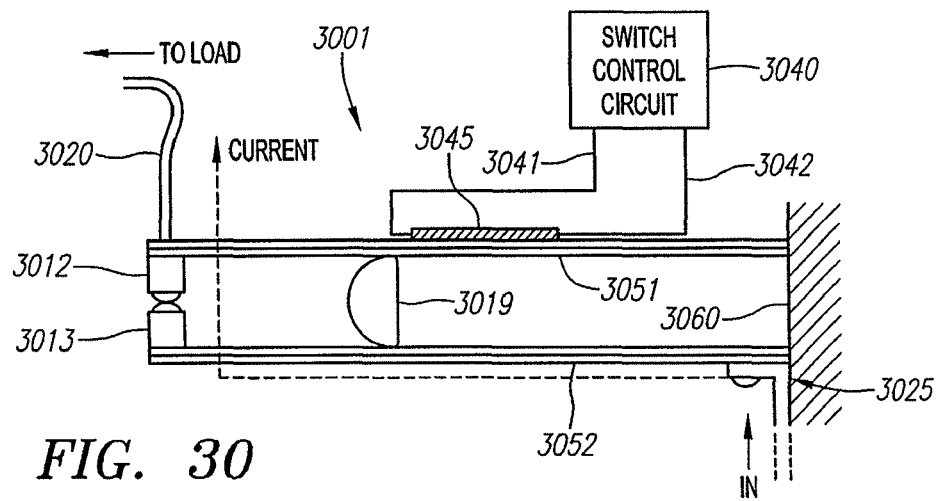
FIG. 30 is a diagram of another embodiment of a controllable electronic switch having opposing deformable members, along with an override control.

FIGS. 26, 28 and 30 are diagrams illustrating additional controllable switch embodiments. FIG. 26 is a diagram of another embodiment of a controllable electronic switch similar to the controllable switch shown in FIG. 6, but with a different location of the incoming power wire illustrated. As shown in FIG. 26, a controllable electronic switch 2600 comprises a deformable member 2601, similar to FIG. 6, which may be formed in the general shape of an arm and may be comprised of two layers 2602, 2603 having different thermal properties. The deformable member 2601 is preferably anchored at one end 2606 to a non-conductive surface 2615. At its other end, the deformable member 2601 preferably resides in contact with an electrical conductor 2620 through contacts 2612. An incoming power wire 2625 is connected to the deformable member 2601 preferably near anchor point 2606. As with FIG. 6, the electrical conductor 2620 may be connected to a load (not shown) and, in normal operation (that is, in the absence of assertion of a switch control signal, as explained below), power from the power signal line 2625 is conducted through the deformable member 2601 and the electrical conductor 2620 to the load.

Figures 1, 27:
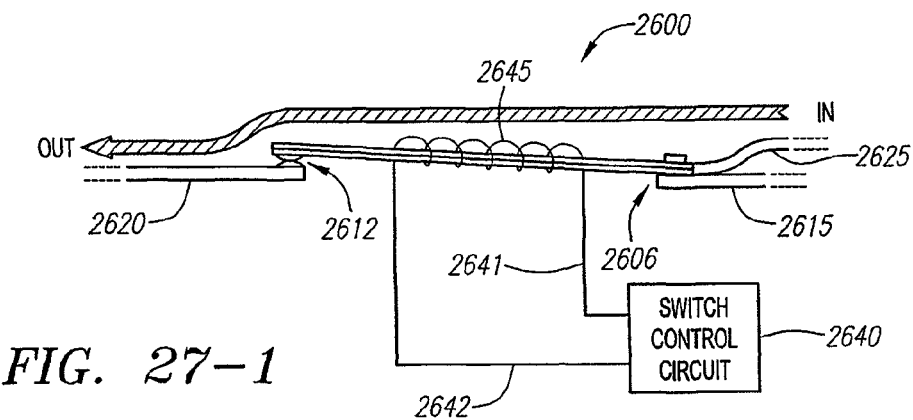
Figures 2, 27:
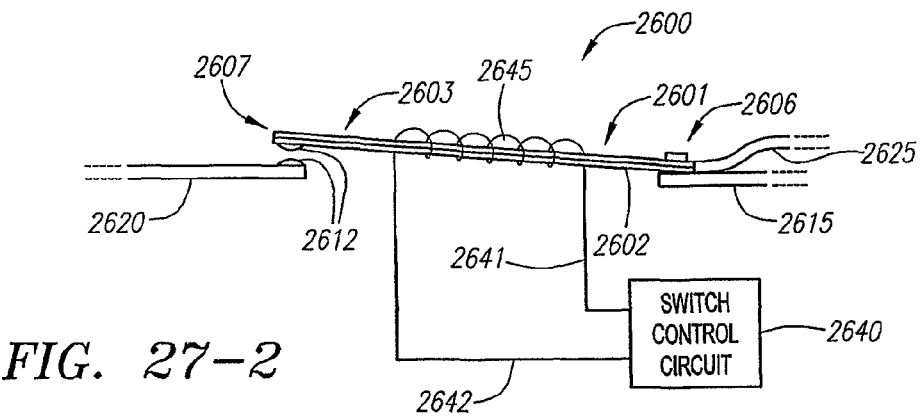

The conductive substances of the different layers 2602, 2603 of the deformable member 2601 are preferably selected to have different thermal properties such that they heat at different rates. A heating element 2645 (such as a resistive coil) is coupled (e.g., wrapped around, in the case of a resistive coil) to the deformable member 2601. The heating element 2645 is preferably controlled by a switch control circuit 2640 in a similar manner to the controllable switch 600 of FIG. 6. When the switch control signal output from the switch control circuit 2640 is not asserted, the heating element 2645 is effectively disconnected (and thus inactive), and power is delivered through the incoming power wire 2625 over the deformable member 2601 to the electrical conductor 2620, from which it can be further distributed to the load. This operation is illustrated in FIG. 27-1. On the other hand, when the switch control signal from the switch control circuit 2640 is asserted, the heating element 2645 heats up, causing the deformable member 2601 to bend and break the electrical circuit path between the incoming power signal line 2625 and the electrical conductor 2620, as illustrated in FIG. 27-2.

So long as the switch control signal from the switch control circuit 2640 is asserted, the heating element 2645 continues to keep the deformable member 2601 bent and the electrical path between the incoming power wire 2625 and the electrical conductor 2620 disconnected. Once the switch control signal from the switch control circuit 2640 is de-asserted, the deformable member 2601 gradually cools, until eventually the deformable member 2601 is no longer deformed. As this occurs, the contacts 2612 once again form an electrical connection, allowing the power signal to pass from the incoming power wire 2625 to the electrical conductor 2620 and then to the load.

When too much current is being drawn by the load such that an over-current situation exists, then the deformable member 2601 also will bend, breaking the electrical connectivity between the incoming power wire 2625 and the electrical conductor 2620 (hence disconnecting power from the load). Thus, the controllable electronic switch 2600 illustrated in FIG. 26 may act as both a circuit breaker, responsive to over-current, and a controllable electronic switch, responsive to a control signal.

FIG. 28 is a diagram of a controllable electronic switch 2801, utilizing a pair of opposing deformable members (e.g., bimetal arms). As shown in FIG. 28, the controllable electronic switch 2801 includes a first deformable member 2851 and a second deformable member 2852, each of which may be formed in the general shape of an arm, facing one another, and may, as previously described, be comprised of two layers having different thermal properties. The opposing deformable members 2851, 2852 are preferably anchored to a non-conductive surface 2815. At their other ends, the deformable members 2851, 2852, when at rest, preferably reside in contact with one another through contacts 2812 and 2813, respectively, and may also are separated from one another by a resting bar 2819. One of the deformable members 2852 is electrically coupled to an incoming power wire 2825, preferably near the anchor point on the non-conductive surface 2825. The other deformable member 2851 is preferably electrically coupled to an electrical conductor 2820 which may in turn be connected to a load (not shown). In normal operation (that is, in the absence of assertion of a switch control signal, as explained below), power from the incoming power line 2825 is conducted through the deformable member 2852 and the electrical conductor 2820 to the load.

Figures 1, 29:
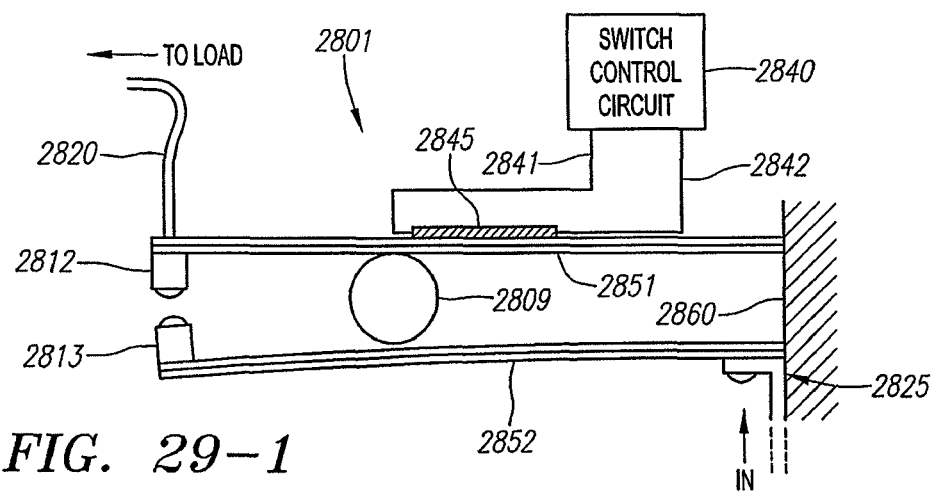
Figures 2, 29:
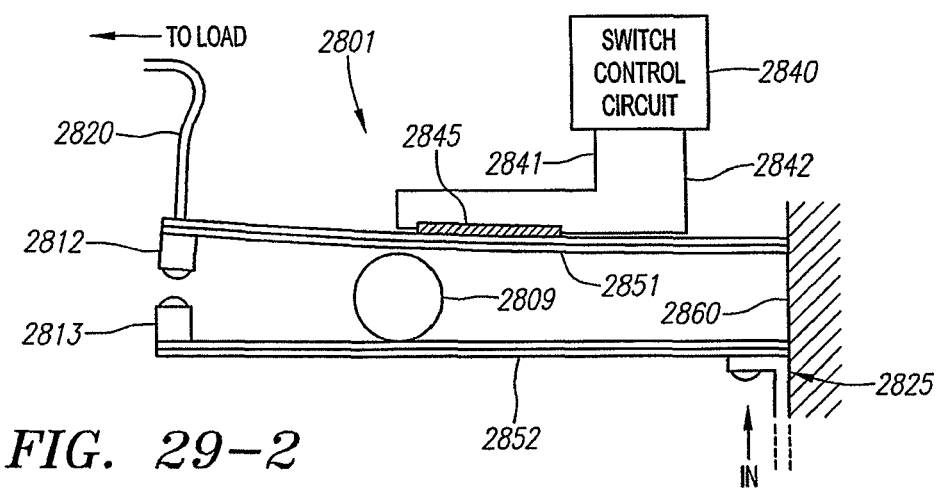

The conductive substances of the different layers of the deformable members 2851, 2852 are preferably selected to have different thermal properties such that they heat at different rates. When too much current is being drawn by the load such that an over-current situation exists, then the deformable member 2652 will bend and break the connection between the electrical contacts 2812, 2813, as illustrated in FIG. 29-1, thereby breaking the supply of power from the incoming power wire 2825 and the electrical conductor 2820 (i.e., the load). The resting bar 2809 prevents the non-circuit-breaker deformable member 2851 from following the bending deformable member 2852, which would otherwise hinder or prevent the bending deformable member 2852 from breaking the circuit connection.

A heating element 2845 (in this example, resistive tape, but could also be a resistive coil or other means) is placed proximate to (e.g., as an adherent, in the case of a resistive tape) to one of the deformable members 2851. The heating element 2845 is preferably controlled by a switch control circuit 2840 in a similar manner to the controllable switch 600 of FIG. 6. When the switch control signal output from the switch control circuit 2840 is not asserted, the heating element 2845 is effectively disconnected (and thus inactive), and power is delivered through the incoming power wire 2825 over the deformable member 2852 and contacts 2812, 2813 to the electrical conductor 2820, from which it can be further distributed to the load. This operation is conceptually illustrated in FIG. 28. On the other hand, when the switch control signal from the switch control circuit 2840 is asserted, the heating element 2845 heats up, causing the deformable member 2851 to bend and break the electrical circuit path between the incoming power signal line 2825 and the electrical conductor 2820, as illustrated in FIG. 29-2. As before, the resting bar 2809 prevents the non-bending deformable member 2852 from following the bending deformable member 2851, which would otherwise hinder or prevent the bending deformable member 2851 from breaking the circuit connection.

So long as the switch control signal from the switch control circuit 2840 is asserted, the heating element 2845 continues to keep the deformable member 2851 bent and the electrical path between the incoming power wire 2825 and the electrical conductor 2820 decoupled. Once the switch control signal from the switch control circuit 2840 is de-asserted, the deformable member 2851 gradually cools, until eventually the deformable member 2851 is no longer deformed. As this occurs, the contacts 2812, 2813 once again form an electrical connection, allowing the power signal to pass from the incoming power wire 2825 to the electrical conductor 2820 and then to the load.

In one aspect, the controllable electronic switch 2801 illustrated in FIG. 28 may act as both a circuit breaker, responsive to over-current, and a controllable electronic switch, responsive to a control signal. The first deformable member 2852 acts in one respect as a "safety arm," bending in response to over-current, while the other deformable member 2851 acts in one respect as a "control arm," bending in response to a control signal from switch control circuit 2840.

Figures 1, 31:
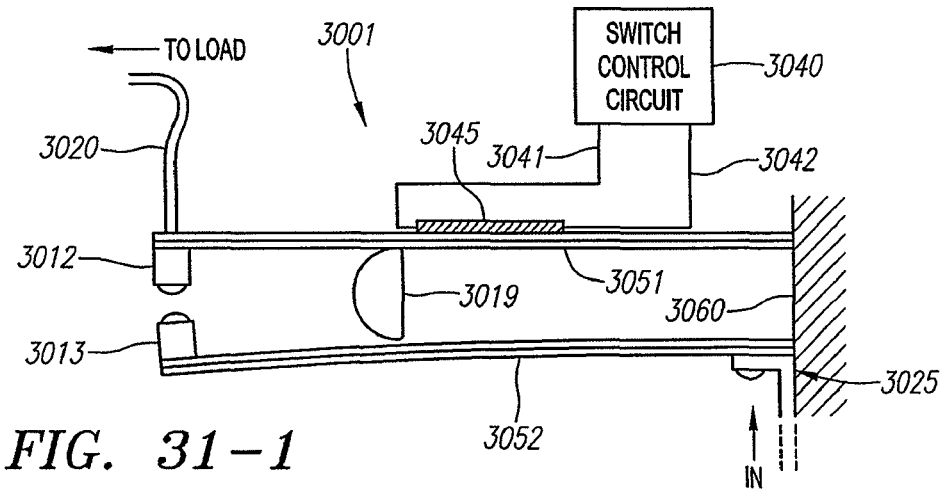
Figures 2, 31:
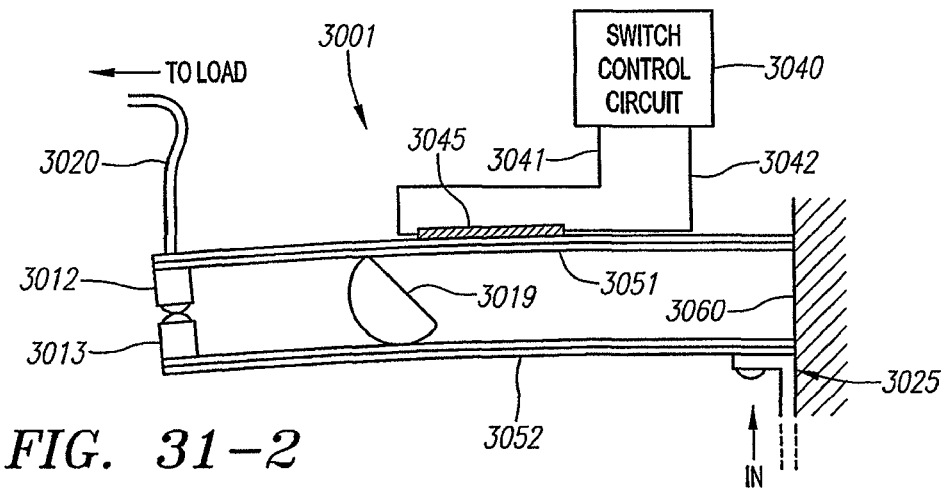

FIG. 30 is a diagram of another embodiment of a controllable electronic switch having opposing deformable members and a override control. The controllable electronic switch 3001 in FIG. 30 is similar to that shown in FIG. 28, with elements numbered "30xx" in FIG. 30 similar to their counterparts numbers "28xx" in FIG. 28, except that a rotatable cam 3019 is used in FIG. 30 in place of a resting bar 2809 shown in FIG. 28. The general operation of the controllable electronic switch 3001 in FIG. 30 is the same a that of FIG. 28. However, the rotatable cam 3019 provides a mechanism for overriding the operation of either of the deformable members 3051, 3052. The operation of the rotatable cam 3019 is illustrated in FIGS. 31-1 and 31-2. In FIG. 31-1 is illustrated an over-current condition that has caused deformable member 3052 to bend, breaking the circuit connection with the load. This is similar to the situation illustrated previously in FIG. 29-1. However, rotation of the rotatable cam 3019 allows the other deformable member 3051 to move towards the opposing deformable member 3052, using the natural spring-like tension of the deformable member 3051, until the contacts 3012, 3013 eventually touch and re-connect the circuit.

A control circuit (not shown) controls the rotation of rotatable cam 3019, and may be electrical or mechanical in nature. For example, the control circuit may be responsive to a remote signal, or else to a manually activated electrical or mechanical switch. The amount of rotation needed for rotatable cam 3019 to allow the deformable members 3051, 3052 to contact each other may be preset. Alternatively, or in addition, a sensing circuit along the path of electrical flow can be used to detect whether current is flowing across contacts 3012, 3013, and the control circuit can continue to rotate the rotatable cam 3019 (to a limit point, if desired) until resumption of power flow is detected by the sensing circuit.

In the exemplary embodiment shown in FIG. 30, the rotatable cam 3019 provides override capability in either direction. Thus, when deformable member 3051 is caused to bend by application of a control signal from switch control circuit 3040, thus stopping the flow of power to the load, the control signal may effectively be overridden by rotation of the rotatable cam 3019 in the opposite direction than that shown in FIG. 31-2. This causes deformable member 3052 to move towards the opposing deformable member 3051, using the natural spring-like tension of the deformable member 3052, until the contacts 3012, 3013 eventually touch and re-connect the circuit. In other words, the override feature works in the same way as illustrated for FIG. 31-2, but in the opposite direction. When rotatable cam 3019 is stationary in its "normal" operating position, as illustrated in FIG. 30, it acts as a resting arm (similar to 2809 in FIG. 28), preventing the deformable members 3051, 3052 from following one another when either is activated under the conditions causing them to bend and break the flow of power to the load.

An override capability such as provided by rotatable cam 3019 may be useful in a variety of applications. For example, it may be desirable to override the operation of deformable member 3051 or 3052 in case of a malfunction. If the controllable electronic switch 2801 or 3001 is deployed as part of a system for a remote control of power distribution to local loads, then it may be desirable to allow a local user to override a command from a remote source which has instructed deformable member 3051 to cut off power to its load—for example, in case there is an emergency requiring the local load to receive power. Likewise, if deformable member 3052 has "tripped" causing a cut-off of power flow to the local load, then an override capability may be desirable particularly in an emergency situation where it is expected that the load can absorb the extra current. As an example, if the load is a landing gear of an airplane which has stuck, causing an over-current situation and thus deformable member 3052 to trip, it may be desirable to allow a manual override capability whereby power to the landing gear can be re-connected, especially if it is expected that the additional power will not harm the landing gear and/or may cause it to unjam. It is expected that many other such situations could be envisioned by those skilled in the art.

While the rotatable cam 3019 is illustrated in FIG. 30 as generally semi-circular in shape, the shape of the cam can be of any (e.g., oval) that is suitable to cause deformable members 3051, 3052 to move closer to one another when the rotatable cam 3019 is rotated. Alternatively, other types of mechanisms may be used. For example, resting bar 2809 in FIG. 28 may be slidable towards each of the deformable members 2851, 2852, and can be moved towards the bending deformable member 2851 (or 2852) to allow the electrical contacts 2812, 2813 to re-connect, thus providing a similar override feature. Similarly, a tapered or conical resting bar 2809 may be used, which can be raised and lowered, thereby increasing and decreasing the distance between the deformable members 2851, 2852 as desired. Alternatively, a bypass conductive bridge (not shown) may be moved from a normally non-contacting position to a contact position across deformable members 2851, 2852, thus providing an effective override by establishing an alternative path for current to flow across deformable members 2851, 2852. In short, any means may be used which results in deformable members 2851, 2852 (or 3051, 3052) rejoining their connection to allow power to flow through to the load.

In one aspect, as with the controllable electronic switch of FIG. 28, the controllable electronic switch 3001 illustrated in FIG. 30 may act as both a circuit breaker, responsive to over-current, and a controllable electronic switch, responsive to a control signal. The first deformable member 3052 acts in one respect as a "safety arm," bending in response to over-current, while the other deformable member 3051 acts in one respect as a "control arm," bending in response to a control signal from switch control circuit 3040. Preferably, an override feature is provided whereby the operation of the control arm or safety arm in breaking the circuit can be overridden. In the particular example of FIG. 30, in one aspect, a 3-position rotating cam 3019 provides override control, with one position being used for "normal" operating mode, a second position for override of bending of the "safety arm," and a third position for override of bending of the "control arm."

Various embodiments of electronic switches as described herein have the advantages of being simple, effective, controllable, reliable and relatively inexpensive, and are generally capable of assisting in the context of a power distribution or management system in order to control the distribution of incoming power signals (either low voltage and/or current or high voltage and/or current) from a power source to a load. In various embodiments, the controllable electronic switches are highly power efficient—for example, they need not consume any power when the switch is closed, and may require only minimal power to open and maintain open. Various controllable electronic switches as disclosed herein may be operated remotely, such as via power control commands transmitted via a remote central station, thus providing a flexible and convenient mechanism to control power distribution.

In some embodiments, it may be desirable for the central station 102 to communicate bi-directionally with the power control circuits 112 at the various local sites 109. For example, the central station 102 may desire to obtain relatively prompt feedback on how many and/or which power control circuits 112 have responded to a power alert stage by shedding electrical loads 120. In such an embodiment, the wireless communication unit 115 at the various local sites would, in addition to comprising a receiver, also comprise a transmitter, and the wireless communication unit 103 of the central station 102 would, conversely, comprise a receiver in addition to comprising a transmitter. Messages transmitted from the various local sites 109 may be distinguished by any of the techniques described herein or any conventional techniques. For example, such transmissions may be distinguished by any combination of different addresses, frequencies, codes, and so on.

In some embodiments, the power control circuits 112 may store historical information regarding their response to various power alert stage levels declared via the central station 102, for billing or other purposes. In the embodiment shown in FIG. 2, for example, the wireless energy control unit 214 may store such historical information in a non-volatile portion of memory 239. The historical information may include such information as which controllable switches 262 were disengaged in response to the declaration of a particular power alert stage level, and/or how much energy consumption was reduced immediately before and after as a result of shedding the electrical load(s) connected to the disengaged controllable switch(es). This type of information may be used by the power utility in connection with providing customer incentives for reducing power consumption using a wireless energy control unit such as described herein. The historical information may be transmitted upon request from the local power control circuits 112 to the central station or power utility 105, assuming bi-directional communication capability exists in the power management system 100. Alternatively, the historical information may be read out through a direct connection, or by transmitting the information over the power lines, or by some alternative technique.

In the various embodiments disclosed herein, any appropriate means for heating the deformable member (e.g., bimetal arm) may be utilized, including not only a resistive coil, resistive tape, or a small thermal resistor, but also other means as well.

While certain embodiments have been described in the text herein and/or illustrated in the drawings, it will be understood that a variety of changes, modifications, additions, or substitutions may be made which take advantage of the principles and concepts underlying the various embodiments described and illustrated. As but a few examples, the embodiments described herein and illustrated in the drawings may not be limited to a particular wireless technique or protocol, or a particular type of message or power command format or sequence, or a particular circuit configuration. Not all of the local electrical loads need to be subject to being shed by the local energy control circuits described herein, nor is there any limitation on the types of additional electrical components (circuit breakers, fuses, transformers, inductors, capacitors, filters, etc.) that can be used in combination or connection with the various embodiments of the invention. Further, rather than using controllable switches which disengage and re-engage electrical loads, various embodiments may use electrical elements capable of regulating power flow on a variable basis; however, such electrical elements generally would be expected to be more expensive and more power consumptive than the preferred controllable switches disclosed herein, and may require more sophisticated control, although such capabilities are considered within the purview of one skilled in the art given the disclosure herein.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A wireless energy control unit, comprising:
   a housing;
   a plurality of controllable switches located within said housing, each of said controllable switches having a first position wherein a power source is electronically connected to an electrical load and a second position wherein the power source is disconnected from the electrical load;
   a plurality of output terminals from said housing, said plurality of output terminals each adapted for connection to one of a plurality of passive circuit breakers located in a circuit breaker panel such that the passive circuit breaker is connected in series with one of said controllable switches, whereby the controllable switch is capable of connecting or disconnecting an electrical load drawing power through the passive circuit breaker;
   a wireless receiver located within said housing; and
   a controller located within said housing and connected to said wireless receiver, said controller receiving messages via said wireless receiver and, in response thereto, selectively switching one or more of said controllable switches between said first position and said second position according to a locally configurable priority, thereby connecting and disconnecting the electrical loads from the power source.

2. The wireless energy control unit of claim 1, further comprising a second housing containing said circuit breakers and having disposed thereon a plurality of manual switches for resetting said circuit breakers, wherein the first housing is integrated with or mounted on the second housing whereby each of said controllable switches is electrically disposed between said power source and the electrical load connected to the passive circuit breaker in series with the controllable switch.

3. The wireless energy control unit of claim 2, further comprising visible status lights for each controllable switch indicating the on/off status of each controllable switch.

4. The wireless energy control unit of claim 1, wherein an external power line is coupled to said housing, said wireless energy control unit further comprising a decoupling element interposed between said external power line and a power supply for the wireless energy control unit through which the wireless energy control unit draws power.

5. The wireless energy control unit of claim 4, wherein said decoupling element comprises a capacitor.

6. The wireless energy control unit of claim 1, further comprising a user interface for configuring the controllable switches.

7. The wireless energy control unit of claim 6, wherein the locally configurable priority is configurable via the user interface.

8. The wireless energy control unit of claim 1, further comprising a gas line shutoff control output signal operated by said controller.

9. A method of controlling power distribution from a power source to a plurality of electrical loads, the method comprising the steps of:
  disposing, in a common housing, a plurality of controllable switches, a wireless receiver, and a controller, said common housing having a user interface for receiving manual user commands and displaying status or other information;
  disposing said common housing in a circuit breaker panel, and electrically connecting each of said controllable switches to a passive circuit breaker in said circuit breaker panel, whereby said controllable switches are electrically disposed between a power source and an electrical load connected to the passive circuit breaker in series therewith;
  programming a locally configurable priority via said user interface;
  receiving messages via said wireless receiver, said messages broadcast by a power utility; and
  in response to said messages, selectively switching one or more of said plurality of controllable switches according to said locally configurable priority, thereby selectively disengaging the power source from the electrical loads in accordance with said locally configurable priority.

10. The method of claim 9, further comprising locating said circuit breakers in a second housing, said second housing having disposed thereon a plurality of manual switches for resetting said circuit breakers, wherein the first housing is integrated with or mounted on the second housing whereby each of said controllable switches is electrically disposed between said power source and the electrical load connected to the passive circuit breaker in series with the controllable switch.

11. The method of claim 10, further comprising activating visible status lights for each controllable switch indicating the on/off status of each controllable switch.

12. The method of claim 9, further comprising coupling an external power line to said housing, said wireless energy control unit further comprising a decoupling element interposed between said external power line and a power supply for the wireless energy control unit through which the wireless energy control unit draws power.

13. The method of claim 9, further comprising operating a gas line shutoff control output signal via said controller.

14. A wireless energy control unit, comprising:
  a housing;
  a plurality of controllable switches located within said housing, each of said controllable switches having a first position wherein a power source is electronically connected to an electrical load in the absence of an applied control signal and a second position wherein the power source is disconnected from the electrical load when the switch's control signal is applied;
  a plurality of output terminals from said housing, said plurality of output terminals each adapted for connection to one of a plurality of local electrical loads, whereby the controllable switch is capable of connecting or disconnecting its respective electrical load;
  a wireless receiver located within said housing;
  an antenna coupled to said wireless receiver;
  a user interface integrated with or mounted on said housing, whereby operation of said controllable switches is selectable according to a locally configurable priority; and
  a controller located within said housing and electrically coupled to said wireless receiver and said user interface, said controller receiving power utility messages via said wireless receiver and, in response thereto, selectively switching one or more of said controllable switches between said first position and said second position according to the locally configurable priority, thereby connecting and disconnecting the electrical loads from the power source.

15. The wireless energy control unit of claim 14, further comprising a second housing containing a plurality of circuit breakers and having disposed thereon a plurality of manual switches for resetting said circuit breakers, wherein the first housing is integrated with or mounted on the second housing whereby each of said controllable switches is electrically disposed in series with one of the passive circuit breakers and the switch's respective electrical load connected to the passive circuit breaker.

16. The wireless energy control unit of claim 14, further comprising a gas line shutoff control output signal operated by said controller.

* * * * *